(12) United States Patent
Dojan et al.

(10) Patent No.: US 8,661,710 B2
(45) Date of Patent: Mar. 4, 2014

(54) METHOD FOR MANUFACTURING A FLUID-FILLED CHAMBER WITH A REINFORCED SURFACE

(71) Applicant: Nike, Inc., Beaverton, OR (US)

(72) Inventors: Frederick J. Dojan, Vancouver, WA (US); Thomas Foxen, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 13/731,435

(22) Filed: Dec. 31, 2012

(65) Prior Publication Data

US 2013/0180059 A1    Jul. 18, 2013

Related U.S. Application Data

(62) Division of application No. 12/015,026, filed on Jan. 16, 2008, now Pat. No. 8,341,857.

(51) Int. Cl.
*A43B 13/20* (2006.01)

(52) U.S. Cl.
USPC .................................. 36/29; 36/28

(58) Field of Classification Search
USPC .............. 36/29, 28, 35 B, 153, 154; 12/142 P
See application file for complete search history.

(56) References Cited

U.S. PATENT DOCUMENTS

| 1,916,483 A | 7/1933 | Krichbaum |
| 2,677,906 A | 5/1954 | Reed |
| 2,703,770 A | 3/1955 | Melzer |
| 3,030,640 A | 4/1962 | Gosman |
| 3,608,215 A | 9/1971 | Fukuoka |
| 3,685,176 A | 8/1972 | Rudy |
| 3,758,964 A | 9/1973 | Nishimura |
| 4,183,156 A | 1/1980 | Rudy |
| 4,187,620 A | 2/1980 | Selner |
| 4,217,705 A | 8/1980 | Donzis |
| 4,219,945 A | 9/1980 | Rudy |
| 4,340,626 A | 7/1982 | Rudy |
| 4,358,902 A | 11/1982 | Cole et al. |

(Continued)

FOREIGN PATENT DOCUMENTS

| EP | 0893074 | 1/1999 |
| EP | 1354527 | 10/2003 |

(Continued)

OTHER PUBLICATIONS

International Search Report and Written Opinion in PCT Application No. PCT/US2009/030735, mailed Jun. 29, 2009.

(Continued)

*Primary Examiner* — Ted Kavanaugh
(74) *Attorney, Agent, or Firm* — Plumsea Law Group, LLC

(57) ABSTRACT

An article of footwear may have an upper and a sole structure secured to the upper. The sole structure includes a fluid-filled chamber with a first surface, an opposite second surface, and a third surface extending between the first and second surfaces. Whereas the first surface and the second surface each have a thickness of one sheet of a polymer material, the third surface may be formed to have a thickness of two overlapping sheets of the polymer material. The third surface may be exposed to an exterior of the footwear to form a portion of a side surface of the sole structure.

15 Claims, 19 Drawing Sheets

(56) References Cited

U.S. PATENT DOCUMENTS

| | | | |
|---|---|---|---|
| 4,506,460 A | 3/1985 | Rudy |
| 4,547,919 A | 10/1985 | Wang |
| 4,698,864 A | 10/1987 | Graebe |
| 4,722,131 A | 2/1988 | Huang |
| 4,782,602 A | 11/1988 | Lakic |
| 4,803,029 A | 2/1989 | Iversen et al. |
| 4,817,304 A | 4/1989 | Parker et al. |
| 4,823,482 A | 4/1989 | Lakic |
| 4,845,861 A | 7/1989 | Moumdjian |
| 4,874,640 A | 10/1989 | Donzis |
| 4,891,855 A | 1/1990 | Cheng-Chung |
| 4,906,502 A | 3/1990 | Rudy |
| 4,912,861 A | 4/1990 | Huang |
| 4,936,029 A | 6/1990 | Rudy |
| 4,991,317 A | 2/1991 | Lakic |
| 4,999,931 A | 3/1991 | Vermeulen |
| 5,022,109 A | 6/1991 | Pekar |
| 5,025,575 A | 6/1991 | Lakic |
| 5,042,176 A | 8/1991 | Rudy |
| 5,044,030 A | 9/1991 | Balaton |
| 5,158,767 A | 10/1992 | Cohen et al. |
| 5,179,792 A | 1/1993 | Brantingham |
| 5,193,246 A | 3/1993 | Huang |
| 5,199,191 A | 4/1993 | Moumdjian |
| 5,224,277 A | 7/1993 | Sang Do |
| 5,224,278 A | 7/1993 | Jeon |
| 5,228,156 A | 7/1993 | Wang |
| 5,235,715 A | 8/1993 | Donzis |
| 5,245,766 A | 9/1993 | Warren |
| 5,253,435 A | 10/1993 | Auger et al. |
| 5,257,470 A | 11/1993 | Auger et al. |
| 5,335,382 A | 8/1994 | Huang |
| 5,337,492 A | 8/1994 | Anderie et al. |
| 5,353,459 A | 10/1994 | Potter et al. |
| 5,367,791 A | 11/1994 | Gross et al. |
| 5,406,719 A | 4/1995 | Potter |
| 5,493,792 A | 2/1996 | Bates et al. |
| 5,572,804 A | 11/1996 | Skaja et al. |
| 5,592,706 A | 1/1997 | Pearce |
| 5,595,004 A | 1/1997 | Lyden et al. |
| 5,669,161 A | 9/1997 | Huang |
| 5,686,167 A | 11/1997 | Rudy |
| 5,704,137 A | 1/1998 | Dean et al. |
| 5,713,141 A | 2/1998 | Mitchell et al. |
| 5,741,568 A | 4/1998 | Rudy |
| 5,755,001 A | 5/1998 | Potter et al. |
| 5,771,606 A | 6/1998 | Litchfield et al. |
| RE35,905 E * | 9/1998 | Vincent et al. ............... 12/142 P |
| 5,832,630 A | 11/1998 | Potter |
| 5,846,063 A | 12/1998 | Lakic |
| 5,907,911 A | 6/1999 | Huang |
| 5,916,664 A | 6/1999 | Rudy |
| 5,925,306 A | 7/1999 | Huang |
| 5,952,065 A * | 9/1999 | Mitchell et al. .............. 428/35.4 |
| 5,976,451 A | 11/1999 | Skaja et al. |
| 5,979,078 A | 11/1999 | McLaughlin |
| 5,993,585 A | 11/1999 | Goodwin et al. |
| 6,009,637 A | 1/2000 | Pavone |
| 6,013,340 A | 1/2000 | Bonk et al. |
| 6,027,683 A | 2/2000 | Huang |
| 6,029,962 A | 2/2000 | Shorten et al. |
| 6,065,150 A | 5/2000 | Huang |
| 6,082,025 A | 7/2000 | Bonk et al. |
| 6,098,313 A | 8/2000 | Skaja |
| 6,127,010 A | 10/2000 | Rudy |
| 6,127,026 A | 10/2000 | Bonk et al. |
| 6,128,837 A | 10/2000 | Huang |
| 6,192,606 B1 | 2/2001 | Pavone |
| 6,203,868 B1 | 3/2001 | Bonk et al. |
| 6,253,466 B1 | 7/2001 | Harmon-Weiss et al. |
| 6,258,421 B1 | 7/2001 | Potter |
| 6,321,465 B1 | 11/2001 | Bonk et al. |
| 6,374,514 B1 | 4/2002 | Swigart |
| 6,385,864 B1 | 5/2002 | Sell, Jr. et al. |
| 6,402,879 B1 | 6/2002 | Tawney et al. |
| 6,430,843 B1 | 8/2002 | Potter et al. |
| 6,457,262 B1 | 10/2002 | Swigart |
| 6,463,612 B1 | 10/2002 | Potter |
| 6,550,085 B2 | 4/2003 | Roux |
| 6,571,490 B2 | 6/2003 | Scarfe et al. |
| 6,665,958 B2 | 12/2003 | Goodwin |
| 6,783,184 B2 | 8/2004 | DiBattista et al. |
| 6,796,056 B2 | 9/2004 | Swigart |
| 6,837,951 B2 | 1/2005 | Rapaport |
| 6,892,477 B2 | 5/2005 | Potter et al. |
| 6,918,198 B2 | 7/2005 | Chi |
| 6,931,764 B2 | 8/2005 | Swigart et al. |
| 6,971,193 B1 | 12/2005 | Potter et al. |
| 7,000,335 B2 | 2/2006 | Swigart et al. |
| 7,051,456 B2 | 5/2006 | Swigart et al. |
| 7,070,845 B2 | 7/2006 | Thomas et al. |
| 7,076,891 B2 | 7/2006 | Goodwin |
| 7,086,179 B2 | 8/2006 | Dojan et al. |
| 7,128,796 B2 | 10/2006 | Hensley et al. |
| 7,131,218 B2 | 11/2006 | Schindler |
| 7,141,131 B2 | 11/2006 | Foxen et al. |
| 7,200,957 B2 | 4/2007 | Hubbard et al. |
| 7,244,483 B2 | 7/2007 | Tawney et al. |
| 8,341,857 B2 | 1/2013 | Dojan et al. |
| 2003/0019128 A1 | 1/2003 | Litchfield et al. |
| 2003/0051373 A1 | 3/2003 | Goodwin |
| 2004/0031170 A1 | 2/2004 | Chi |
| 2004/0250448 A1 | 12/2004 | Reed et al. |
| 2005/0132607 A1 | 6/2005 | Dojan et al. |
| 2007/0175576 A1 * | 8/2007 | Dojan et al. ................. 156/221 |

FOREIGN PATENT DOCUMENTS

| | | |
|---|---|---|
| GB | 2060352 | 5/1981 |
| WO | WO9111931 | 8/1991 |
| WO | WO9616564 | 6/1996 |
| WO | WO0170060 | 9/2001 |
| WO | WO2005063071 | 7/2005 |

OTHER PUBLICATIONS

The First Office Action in Chinese Application No. 200980101609.5. issued May 31, 2011 (including non-certified English translation).

* cited by examiner

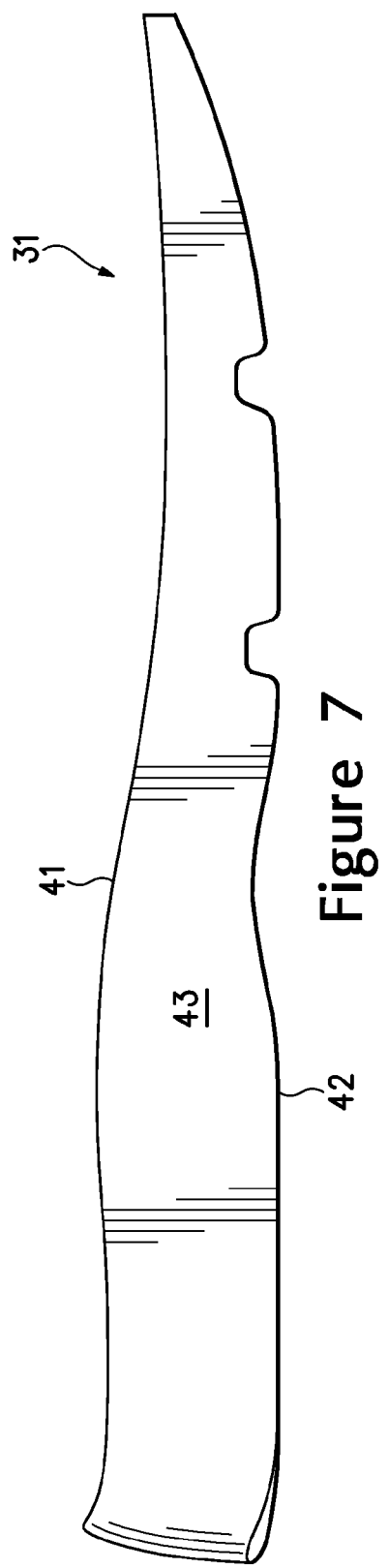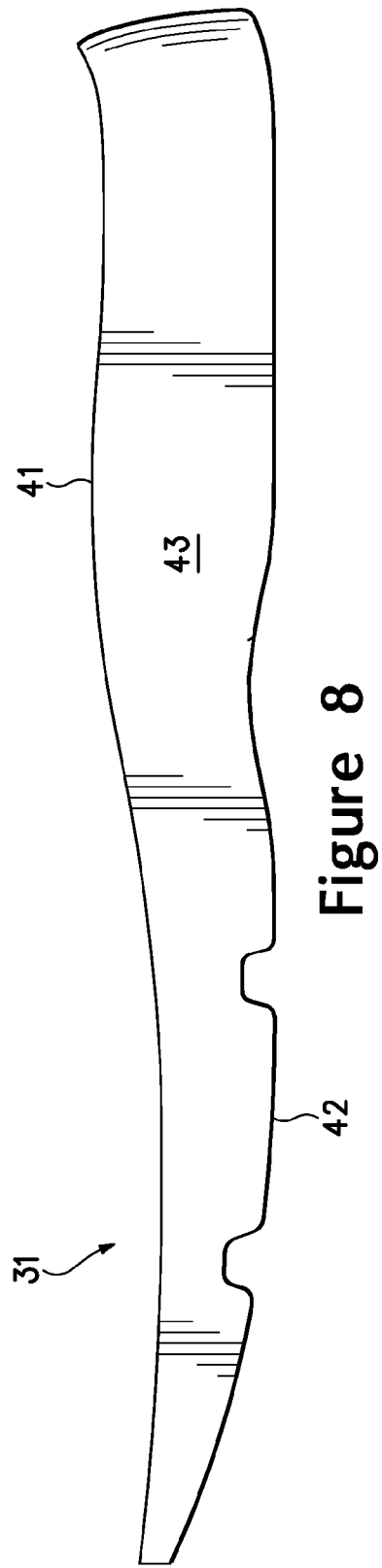
Figure 7
Figure 8

METHOD FOR MANUFACTURING A FLUID-FILLED CHAMBER WITH A REINFORCED SURFACE

CROSS-REFERENCE TO RELATED APPLICATION

This application is a divisional application of co-pending application Ser. No. 12/015,026 filed Jan. 16, 2008, the disclosure of which is hereby incorporated by reference.

BACKGROUND

A conventional article of athletic footwear includes two primary elements, an upper and a sole structure. The upper may be formed from a plurality of material elements (e.g., textiles, leather, and foam materials) defining a void that securely receives and positions the foot with respect to the sole structure. The sole structure is secured to a lower surface of the upper and is generally positioned to extend between the foot and the ground. In addition to attenuating ground reaction forces, the sole structure may provide traction and control various foot motions, such as pronation. Accordingly, the upper and the sole structure operate cooperatively to provide a comfortable structure that is suited for a wide variety of ambulatory activities, such as walking and running.

The sole structure of an article of athletic footwear generally exhibits a layered configuration that includes a comfort-enhancing insole, a resilient midsole formed from a polymer foam, and a ground-contacting outsole that provides both abrasion-resistance and traction. Suitable polymer foam materials for the midsole include ethylvinylacetate or polyurethane that compress resiliently under an applied load to attenuate ground reaction forces. Conventional polymer foam materials compress resiliently, in part, due to the inclusion of a plurality of open or closed cells that define an inner volume substantially displaced by gas. Following repeated compressions, the cell structure of the polymer foam may deteriorate, thereby resulting in an decreased compressibility and decreased force attenuation characteristics of the sole structure.

One manner of reducing the mass of a polymer foam midsole and decreasing the effects of deterioration following repeated compressions is to incorporate a fluid-filled chamber into the sole structure. The chamber may be formed from a polymer material that is sealed to enclose the fluid. In addition, the chamber may be encapsulated within the polymer foam material of the midsole, or the chamber may form substantially all of the midsole. The fluid within the chamber may be pressurized or unpressurized, and in some configurations the chamber may include two or more subchambers that are each pressurized differently. In order to impart a specific shape to a chamber, interior bonds or reinforcing structures may prevent portions of the chamber from expanding or otherwise distending outward when pressurized. Some articles of footwear also incorporate fluid systems that include a pump, valves, and various conduits to pressurize a chamber with air, for example.

Fluid-filled chambers suitable for footwear applications may be manufactured by a two-film technique, in which two separate sheets of elastomeric film are formed to exhibit the overall peripheral shape of the chamber. The sheets are then bonded together along their respective peripheries to form a sealed structure, and the sheets are also bonded together at predetermined interior areas to give the chamber a desired configuration. That is, interior bonds (i.e., bonds spaced inward from the periphery) provide the chamber with a predetermined shape and size upon pressurization. In order to pressurize the chamber, a nozzle or needle connected to a fluid pressure source is inserted into a fill inlet formed in the chamber. Following pressurization of the chamber, the fill inlet is sealed and the nozzle is removed. A similar procedure, referred to as thermoforming, may also be utilized, in which a heated mold forms or otherwise shapes the sheets of elastomeric film during the manufacturing process.

Chambers may also be manufactured by a blow-molding technique, wherein a molten or otherwise softened elastomeric material in the shape of a tube is placed in a mold having the desired overall shape and configuration of the chamber. The mold has an opening at one location through which pressurized air is provided. The pressurized air induces the liquefied elastomeric material to conform to the shape of the inner surfaces of the mold. The elastomeric material then cools, thereby forming a chamber with the desired shape and configuration. As with the two-film technique, a nozzle or needle connected to a fluid pressure source is inserted into a fill inlet formed in the chamber in order to pressurize the chamber. Following pressurization of the chamber, the fill inlet is sealed and the nozzle is removed.

SUMMARY

In one aspect, the invention provides a method for manufacturing a fluid-filled chamber. A first sheet, a second sheet, and a third sheet of a polymer material may be located within a mold. The first sheet is shaped to define at least a first surface and an interior layer of a sidewall portion of the chamber. The second sheet is shaped to define a second surface of the chamber. In addition, the third sheet is bonded to the interior layer of the sidewall portion to form an exterior layer of the sidewall portion.

In another aspect, the invention provides another method for manufacturing a fluid-filled chamber. Three separate sheets of a polymer material may be placed within a mold. At least two of the sheets is shaped to form a first surface and an opposite second surface of the chamber. At least two of the sheets are bonded together in an overlapping configuration to form a third surface of the chamber, the third surface being located to extend between the first surface and the second surface.

The advantages and features of novelty characterizing aspects of the invention are pointed out with particularity in the appended claims. To gain an improved understanding of the advantages and features of novelty, however, reference may be made to the following descriptive matter and accompanying drawings that describe and illustrate various embodiments and concepts related to the invention.

BRIEF DESCRIPTION OF THE DRAWINGS

The foregoing Summary and the following Detailed Description will be better understood when read in conjunction with the accompanying drawings.

FIG. 7 is a lateral side elevational view of the chamber.

FIG. 8 is a medial side elevational view of the chamber.

DETAILED DESCRIPTION

The following discussion and accompanying figures disclose various configurations of a fluid-filled chamber for an article of footwear. Concepts related to the chamber are disclosed with reference to footwear having a structure that is suitable for running. The chamber is not limited solely to footwear designed for running, however, and may be utilized with a wide range of athletic footwear styles, including basketball shoes, tennis shoes, football shoes, cross-training shoes, walking shoes, soccer shoes, and hiking boots, for example. The chamber may also be utilized with footwear styles that are generally considered to be non-athletic, including dress shoes, loafers, sandals, and boots. Accordingly, the concepts disclosed herein apply to a wide variety of footwear styles, in addition to the specific style discussed in the following material and depicted in the accompanying figures.

Footwear Structure

Figure 1:
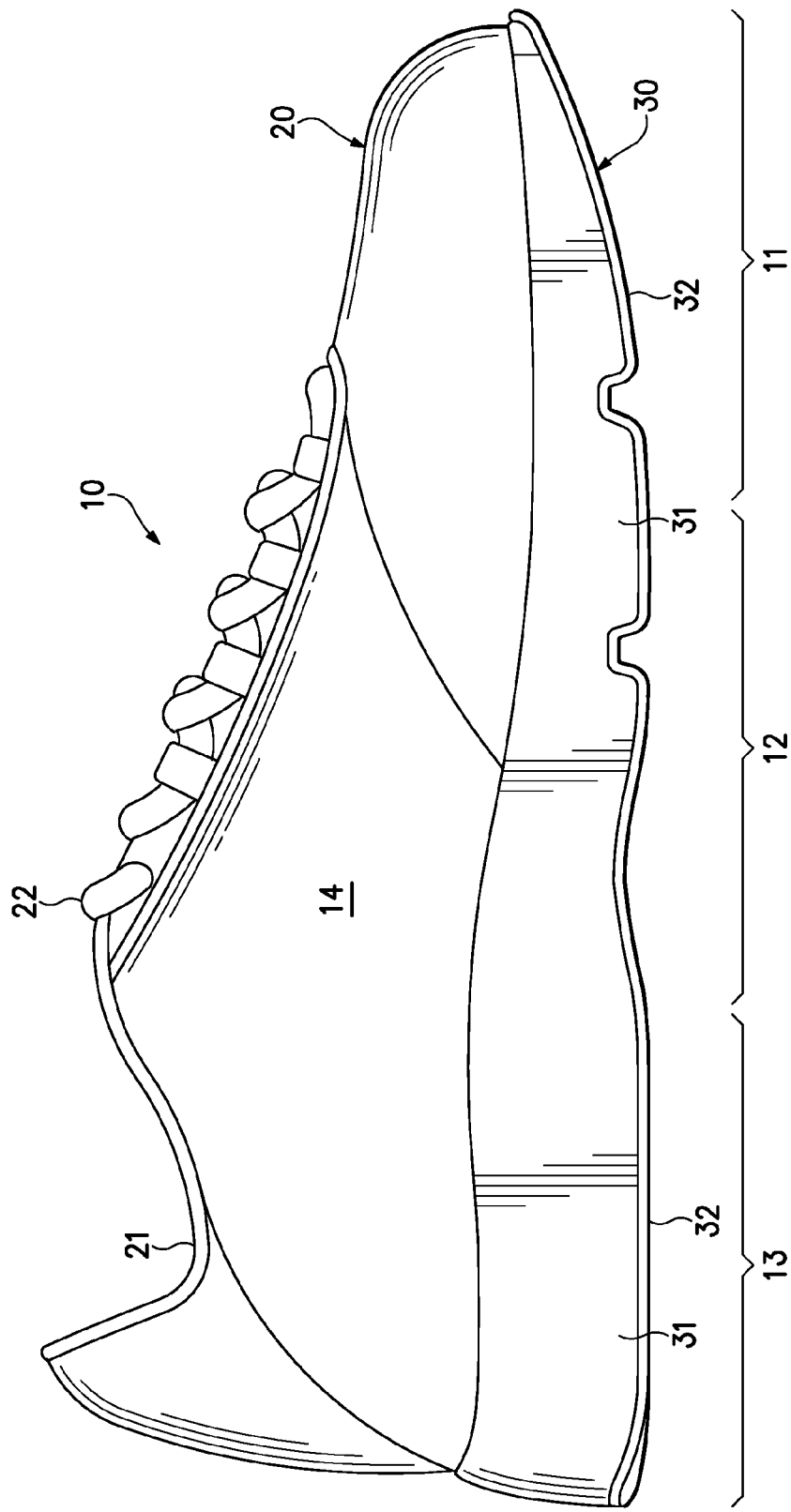
FIG. 1 is a lateral side elevational view of an article of footwear incorporating a fluid-filled chamber.
Figure 2:
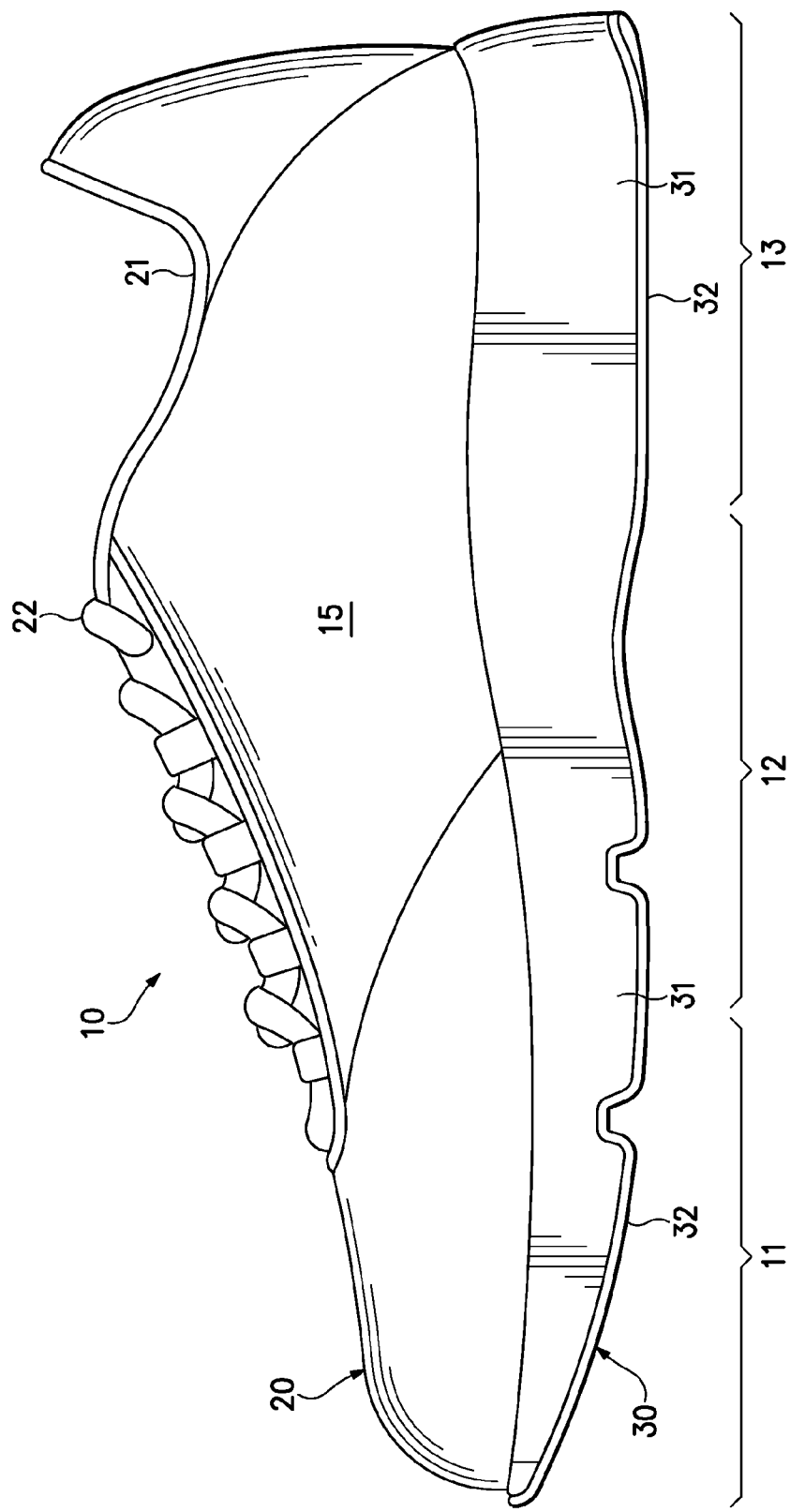
FIG. 2 is a medial side elevational view of the article of footwear.
Figure 3:
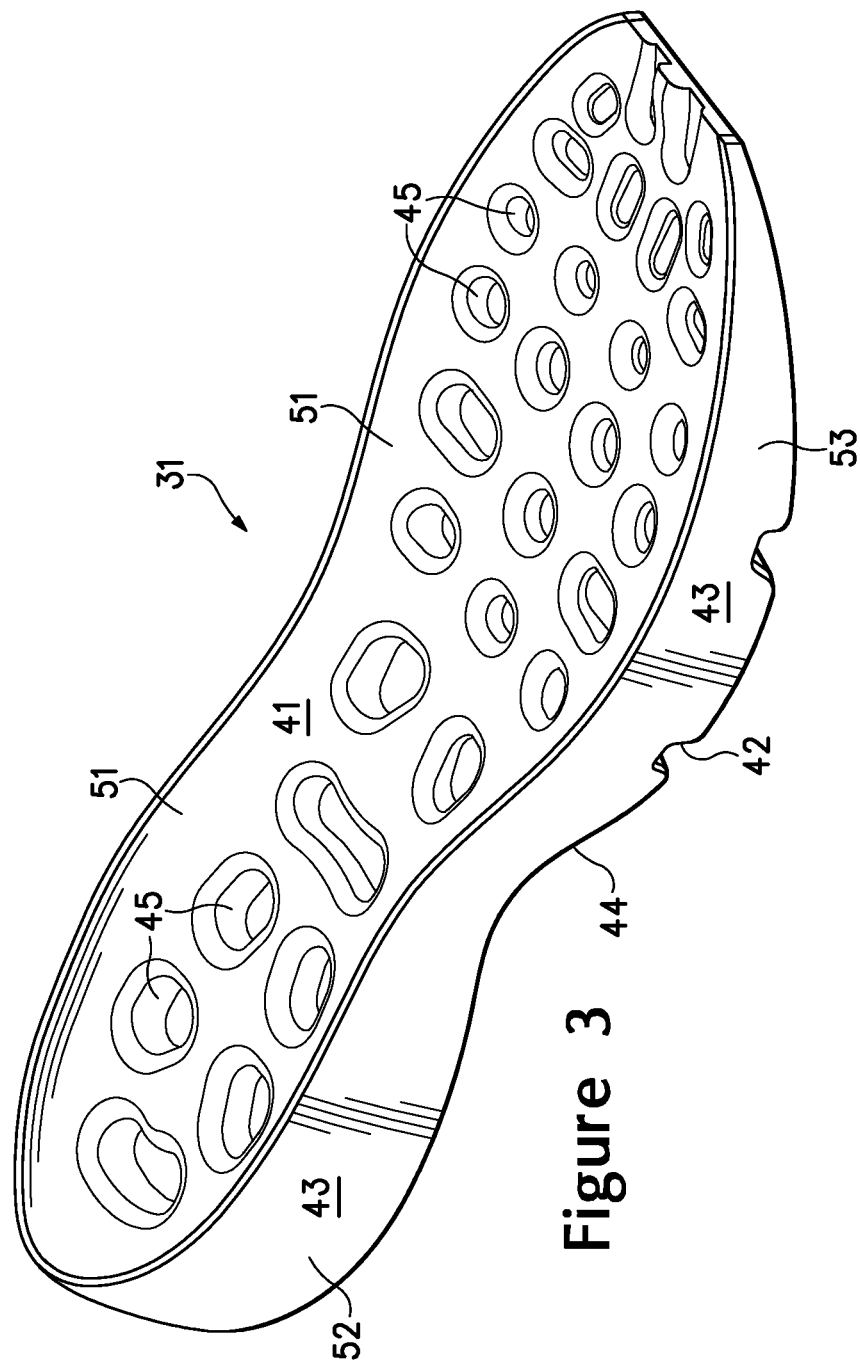
FIG. 3 is a perspective view of the chamber.
Figure 4:
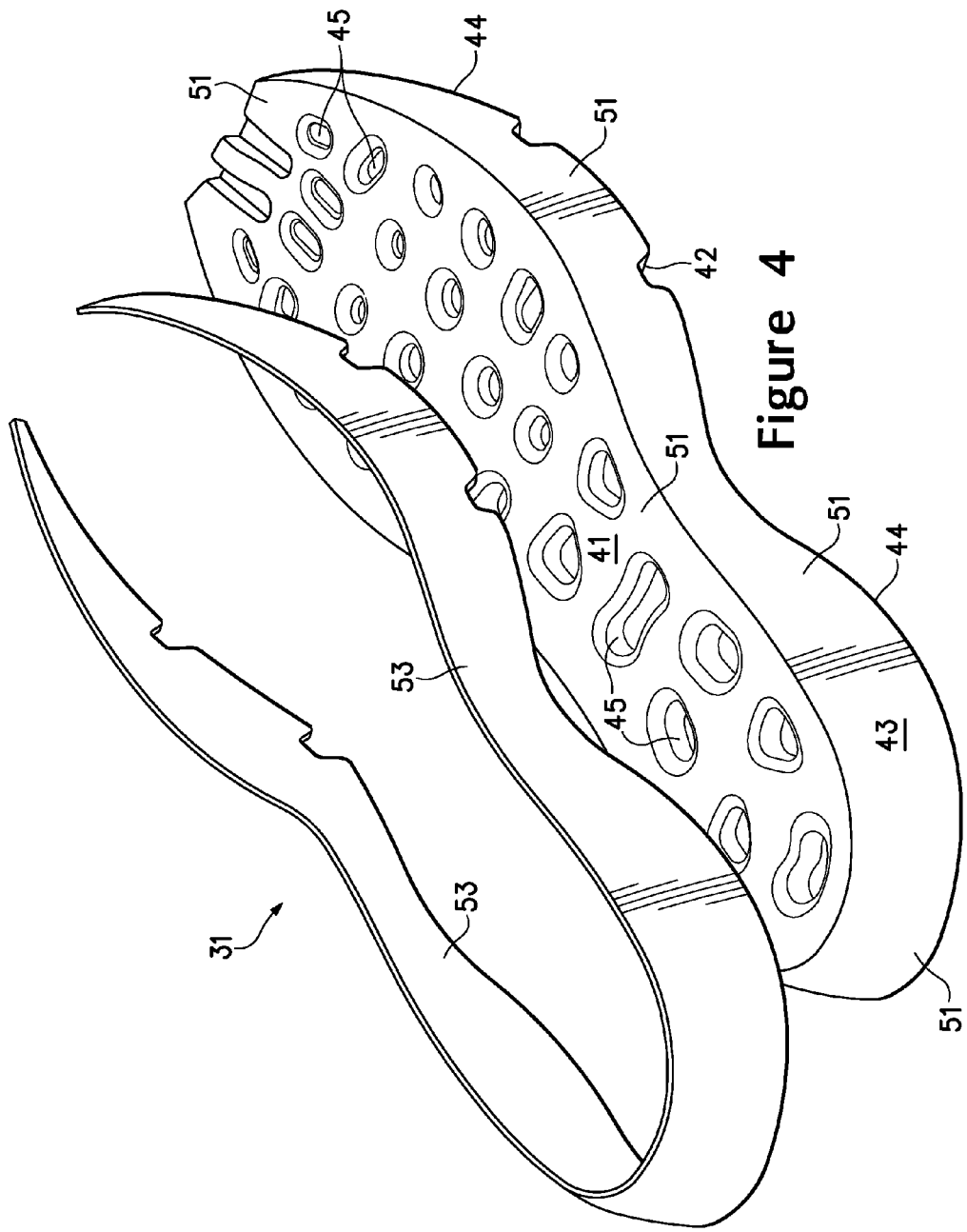
FIG. 4 is an exploded perspective view of the chamber.

An article of footwear 10 is depicted in FIGS. 1 and 2 as including an upper 20 and a sole structure 30. For reference purposes, footwear 10 may be divided into three general regions: a forefoot region 11, a midfoot region 12, and a heel region 13. Footwear 10 also includes a lateral side 14 and a medial side 15. Forefoot region 11 generally includes portions of footwear 10 corresponding with the toes and the joints connecting the metatarsals with the phalanges. Midfoot region 12 generally includes portions of footwear 10 corresponding with the arch area of the foot, and heel region 13 corresponds with rear portions of the foot, including the calcaneus bone. Lateral side 14 and medial side 15 extend through each of regions 11-13 and correspond with opposite sides of footwear 10. Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to upper 20, sole structure 30, and individual elements thereof.

Upper 20 is depicted as having a substantially conventional configuration incorporating a plurality material elements (e.g., textiles, foam, leather, and synthetic leather) that are stitched or adhesively bonded together to form an interior void for securely and comfortably receiving a foot. The material elements may be selected and located with respect to upper 20 in order to selectively impart properties of durability, air-permeability, wear-resistance, flexibility, and comfort, for example. An ankle opening 21 in heel region 13 provides access to the interior void. In addition, upper 20 may include a lace 22 that is utilized in a conventional manner to modify the dimensions of the interior void, thereby securing the foot within the interior void and facilitating entry and removal of the foot from the interior void. Lace 22 may extend through apertures in upper 20, and a tongue portion of upper 20 may extend between the interior void and lace 22. Given that various aspects of the present discussion primarily relate to sole structure 30, upper 20 may exhibit the general configuration discussed above or the general configuration of practically any other conventional or non-conventional upper. Accordingly, the overall structure of upper 20 may vary significantly.

Sole structure 30 is secured to upper 20 and located below upper 20, thereby extending between the foot and the ground when footwear 10 is worn. The primary elements of sole structure 30 are a fluid-filled chamber 31 and an outsole 32 that are secured together. Chamber 31 is formed from various polymer sheets that provide a sealed outer barrier for enclosing a fluid, which may be pressurized. In addition to attenuating ground reaction forces (i.e., providing cushioning for the foot), chamber 31 may have a configuration that imparts stability and limits various foot motions, such as pronation. Outsole 32 forms a ground-contacting portion of footwear 10 and may be formed from a durable and wear-resistant rubber material, for example, that is textured to enhance the traction (i.e., friction) properties between footwear 10 and the ground. In some configurations of footwear 10, outsole 32 may be absent such that chamber 31 or another element of sole structure 30 forms the ground-contacting portion of footwear 10.

In addition to chamber 31 and outsole 32, sole structure 30 may incorporate one or more foam layers, plates, support members, moderators, or reinforcing structures, for example, that further enhance the ground reaction force attenuation characteristics or other performance properties of sole structure 30. As depicted, chamber 31 extends between upper 20 and outsole 32, but the foam layer, plate, or other element may be located between chamber 31 and either of upper 20 and outsole 32. In some configurations, the foam layer, plate, or other element may be embedded within chamber 31. In order to enhance the overall comfort of footwear 10, sole structure 30 may also incorporate an insole or sockliner that is located within the void in upper 20 and adjacent a plantar (i.e., lower) surface of the foot.

Chamber Configuration

Chamber 31 is depicted individually in FIGS. 3-8 as having a configuration that is suitable for footwear applications. When incorporated into footwear 10, chamber 31 has a shape that fits within a perimeter of sole structure 30 and substantially extends from forefoot region 11 to heel region 13 and also from lateral side 14 to medial side 15, thereby corresponding with a general outline of the foot. When the foot is located within upper 20, chamber 31 extends under substantially all of the foot in order to attenuate ground reaction forces that are generated when sole structure 30 is compressed between the foot and the ground during various ambulatory activities, such as running and walking. In other configurations, as discussed in greater detail below, chamber 31 may be spaced inward from the perimeter of sole structure 30 and may extend under only a portion of the foot.

An exterior of chamber 31 is formed from a polymer material that provides a sealed barrier for enclosing a pressurized fluid. The polymer material defines an upper surface 41, an opposite lower surface 42, and a sidewall surface 43 that extends around a periphery of chamber 31 and between surfaces 41 and 42. Chamber 31 may be formed from three separate polymer sheets 51, 52, and 53 that are molded and bonded during a thermoforming process. More particularly, the thermoforming process (a) imparts shape to sheet 51 in order to form upper surface 41 and a portion of sidewall surface 43, (b) imparts shape to sheet 52 in order to form lower surface 42, (c) forms a peripheral bond 44 that extends around an interface between lower surface 42 and sidewall surface 43, (d) forms a plurality of interior bonds 45 that join interior portions of sheets 51 and 52 and extends between surfaces 41 and 42, and (e) bonds sheets 51 and 53 together in an overlapping configuration in sidewall surface 43. Whereas peripheral bond 44 joins the sheets 51 and 52 to form a seal that effectively prevents the fluid from escaping the interior of chamber 31, interior bonds 45 and the overlapping configuration of sheets 51 and 53 in sidewall surface 43 limit the degree to which chamber 31 expands outward or otherwise distends due to the pressure of the fluid.

Chamber 31 is shaped and contoured to provide a structure that is suitable for footwear applications. As noted above, chamber 31 has a shape that fits within a perimeter of sole structure 30 and extends under substantially all of the foot, thereby corresponding with a general outline of the foot. In addition, surfaces 41 and 42 are contoured in a manner that is suitable for footwear applications. With reference to FIGS. 7 and 8, chamber 31 exhibits a tapered configuration between heel region 13 and forefoot region 11. That is, the portion of chamber 31 in heel region 13 exhibits a greater overall height dimension than the portion of chamber 31 in forefoot region 11. Chamber 31 also has a configuration wherein the portion of chamber 31 in heel region 13 is generally at a greater elevation than the portion of chamber 31 in forefoot region 11. More particularly, the portion of upper surface 41 in heel region 13 is raised above the portion of upper surface 41 in forefoot region 11. The tapering of chamber 31 and the differences in elevations in areas of upper surface 41 impart an overall contour to chamber 31 that complements the general anatomical structure of the foot. That is, these contours ensure that the heel of the foot is slightly raised in relation to the forefoot.

Figure 6A:
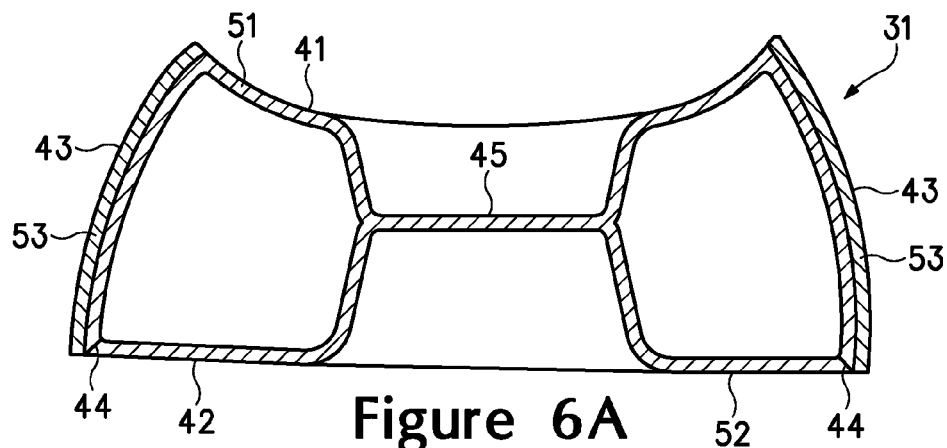
FIGS. 6A-6C are cross-sectional views of the chamber, as defined by section lines 6A-6C in FIG. 5.
Figure 6B:
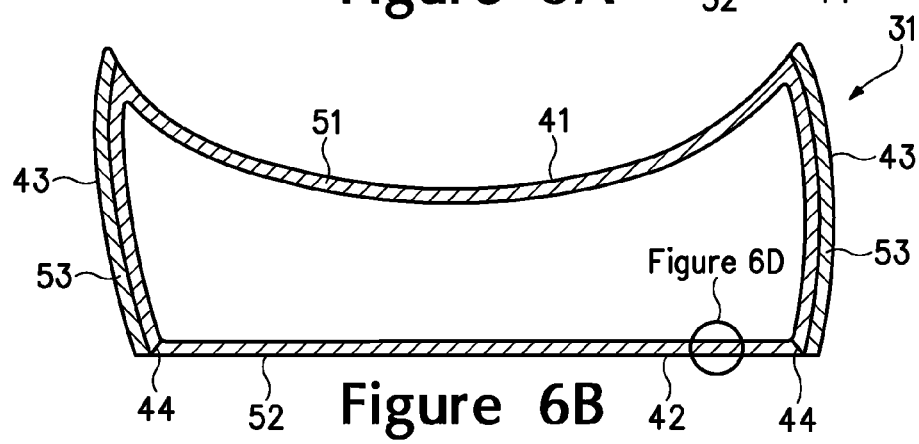
Figure 6C:
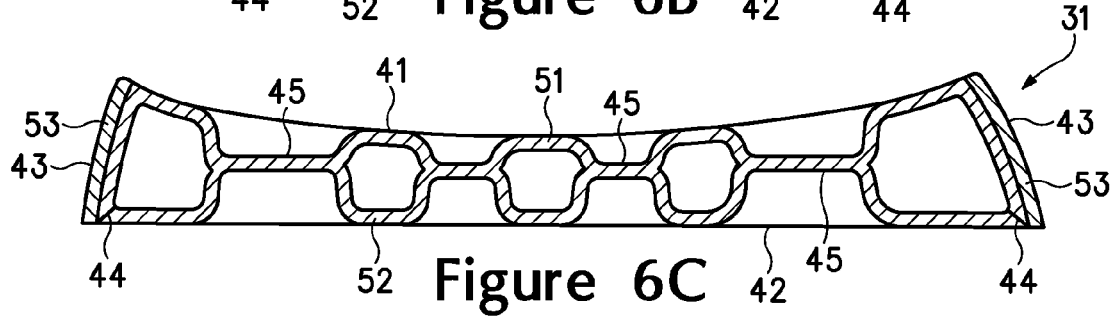
Figure 6D:
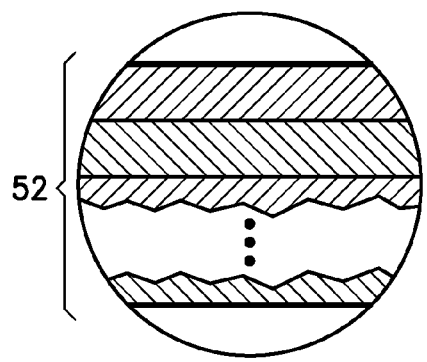
FIG. 6D is a partial cross-sectional view of the chamber, as defined by the circle labeled "FIG. 6D" in FIG. 6B.

In addition to tapering and changes in elevation between regions 11 and 13, upper surface 41 is contoured to provide support for the foot. For example, upper surface 41 forms a depression in heel region 13 for receiving the heel of the foot, as depicted in FIG. 6A. That is, the heel of the foot may rest within the depression to assist with securing the position of the foot relative to chamber 31. Upper surface 41 may also protrude upward in the portion of midfoot region 12 corresponding with medial side 15 in order to support the arch of the foot. In addition, the portion of upper surface 41 in forefoot region 11 has a generally planar configuration or a less depressed configuration than heel region 13 for supporting forward portions of the foot, as depicted in FIG. 6C. Accordingly, upper surface 41 defines various contours to further complement the general anatomical structure of the foot.

The polymer material forming the exterior or outer barrier of chamber 31 encloses a fluid pressurized between zero and three-hundred-fifty kilopascals (i.e., approximately fifty-one pounds per square inch) or more. In addition to air and nitrogen, the fluid contained by chamber 31 may include octafluoropropane or be any of the gasses disclosed in U.S. Pat. No. 4,340,626 to Rudy, such as hexafluoroethane and sulfur hexafluoride, for example. In some configurations, chamber 31 may incorporate a valve that permits the individual to adjust the pressure of the fluid. In other configurations, chamber 31 may be incorporated into a fluid system as a pump chamber or a pressure chamber. When the fluid within chamber 31 is pressurized, the fluid places an outward force upon the polymer material forming surfaces 41-43. Although the shape of chamber 31 does not change significantly between the pressurized and unpressurized states, the outward force of the fluid expands or otherwise distends chamber 31 to a relatively small degree. As discussed generally above, two attributes of chamber 31 ensure that chamber 31 exhibits a relatively small degree of expansion or distension when pressurized: (1) interior bonds 45 and (2) the overlapping configuration in sidewall surface 43. That is, these attributes provide a relatively stable configuration that resists deformation in chamber 31 due to pressurization of the fluid.

Figure 5:
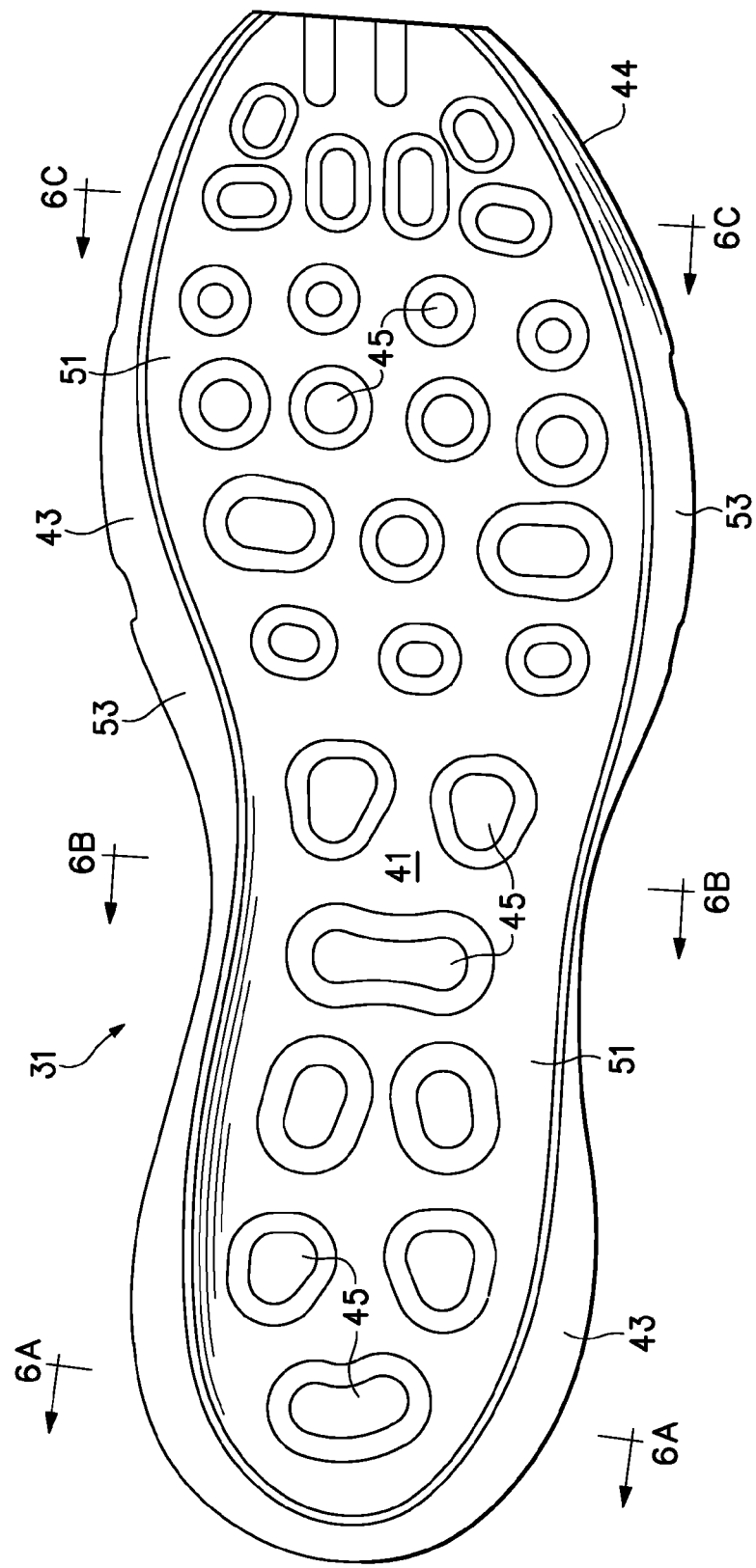
FIG. 5 is a top plan view of the chamber.

Interior bonds 45 join interior portions of sheets 51 and 52 and extend between surfaces 41 and 42 and through an interior of chamber 31. Referring to FIG. 5, for example, interior bonds 45 are distributed throughout each of regions 11-13 and multiple interior bonds 45 may be located between each of sides 14 and 15. Although some of interior bonds 45 may be located to coincide with sidewall surface 43, each of interior bonds 45 are depicted as being spaced inward from sidewall surface 43. Referring to the cross-sections of FIGS. 6A and 6C, interior bonds 45 form depressions in chamber 31 that extend downward from upper surface 41 and upward from lower surface 42. Sheets 51 and 52, which respectively form surfaces 41 and 42, are joined to each other to form interior bonds 45 at a location that is an approximate midpoint between surfaces 41 and 42. In further configurations, interior bonds 45 may be formed at locations that are closer to either of surfaces 41 and 42, or interior bonds 45 may have a sloped configuration.

Upper surface 41 and lower surface 42 are respectively formed from sheets 51 and 52. In contrast, sidewall surface 43 is formed from overlapping sheets 51 and 53. Referring to FIGS. 4 and 6A-6C, one sheet of polymer material (i.e., sheet 51) forms the thickness of upper surface 41, one sheet of polymer material (i.e., sheet 52) forms the thickness of lower surface 42, and two sheets of polymer material (i.e., sheet 51 and sheet 53) form the thickness of sidewall surface 43. In comparison with surfaces 41 and 42, which have a thickness of one sheet of polymer material, sidewall surface 43 has a thickness of two sheets of the polymer material. That is, the thickness of sidewall surface 43 includes both of sheets 51 and 53, which overlap each other. Although substantially all of surfaces 41 and 42 are formed from one sheet and substantially all of sidewall surface 43 is formed from two sheets, portions of surface 41 and 42 may be formed from two sheets and portions of sidewall surface 43 may be formed from one sheet in some configurations of chamber 31. For example, sheet 53 may be limited to rear areas of chamber 31 or sheet 53 may define apertures that expose portions of sheet 51. In general, however, a majority or at least half of surfaces 41 and 42 are formed from one sheet and a majority or at least half of sidewall surface 43 is formed from two sheets.

The degree to which surfaces 41-43 bend, flex, stretch, elongate, or otherwise deform depends upon various factors, one of which is the overall thickness of each of surfaces 41-43. Whereas upper surface 41 has the thickness of sheet 51 and lower surface 42 has the thickness of sheet 52, sidewall surface 43 has the thickness of both of sheets 51 and 53. Forming sidewall surface 43 to have the thickness of overlapping sheets 51 and 53 enhances the ability of sidewall surface 43 to resist deformation due to the pressurized fluid within chamber 31. Accordingly, the overlapping configuration of sheets 51 and 53 in sidewall surface 43 decreases the degree to which sidewall surface 43 expands outward or otherwise distends due to the pressure of the fluid.

During the thermoforming operation that forms chamber 31, each of sheets 51-53 may be stretched to conform with the various contours of chamber 31. Whereas sheets 51 and 52 are stretched to form the contours of upper surface 41 and lower surface 42, which include the depressions formed by interior bonds 45, sheet 53 is stretched to a lesser degree because of the relatively even configuration of sidewall surface 43. Accordingly, sheet 53 may have a greater thickness than either of sheets 51 and 52, which may further enhance the ability of sidewall surface 43 to resist deformation due to the pressurized fluid within chamber 31.

The overlapping configuration of sheets 51 and 53 in sidewall surface 43 also has an effect upon the wear resistance of chamber 31. Whereas surfaces 41 and 42 are respectively secured to upper 20 and outsole 32, sidewall surface 43 is exposed at lateral side 14, medial side 15, and around heel region 13. When footwear 10 is worn, the exposed sidewall surface 43 may experience wear. For example, sidewall surface may be abraded by objects or exposed to chemicals that break down the molecular structure of sheets 51 and 53. The increased thickness of sidewall surface 43 due to the overlapping configuration of sheets 51 and 53 may, therefore, increase the overall durability of the exposed portions of chamber 31. Accordingly, the overlapping configuration in sidewall surface 43 may enhance the durability of footwear 10 in addition to resisting deformation due to the pressurized fluid within chamber 31.

A wide range of polymer materials may be utilized for chamber 31. In selecting materials for the outer barrier of chamber 31, engineering properties of the material (e.g., tensile strength, stretch properties, fatigue characteristics, dynamic modulus, and loss tangent) as well as the ability of the material to prevent the diffusion of the fluid contained by chamber 31 may be considered. When formed of thermoplastic urethane, for example, the outer barrier of chamber 31 may have a thickness of approximately 1.0 millimeter, but the thickness may range from 0.25 to 3.0 millimeters or more, for example. In addition to thermoplastic urethane, examples of polymer materials that may be suitable for chamber 31 include polyurethane, polyester, polyester polyurethane, and polyether polyurethane. Chamber 31 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein a center layer is formed of ethylene-vinyl alcohol copolymer, layers adjacent to the center layer are formed of thermoplastic polyurethane, and outer layers are formed of a regrind material of thermoplastic polyurethane and ethylene-vinyl alcohol copolymer. Another suitable material for chamber 31 is a flexible microlayer membrane that includes alternating layers of a gas barrier material and an elastomeric material, as disclosed in U.S. Pat. Nos. 6,082,025 and 6,127,026 to Bonk, et al. Accordingly, chamber 31 may be formed from various sheets of a polymer material, each of the sheets including multiple layers of different polymer materials, as depicted for example in FIG. 6D. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al.

Manufacturing Process

A thermoforming process may be utilized to manufacture chamber 31. As noted above, the thermoforming process forms chamber 31 from three polymer sheets 51-53 that are molded and bonded to define surfaces 41-43. More particularly, the thermoforming process (a) imparts shape to sheet 51 in order to form upper surface 41 and a portion of sidewall surface 43, (b) imparts shape to sheet 52 in order to form lower surface 42, (c) forms a peripheral bond 44 that extends around an interface between lower surface 42 and sidewall surface 43, (d) forms a plurality of interior bonds 45 that join interior portions of sheets 51 and 52 and extends between surfaces 41 and 42, and (e) bonds sheets 51 and 53 together in an overlapping configuration in sidewall surface 43.

Figure 9:
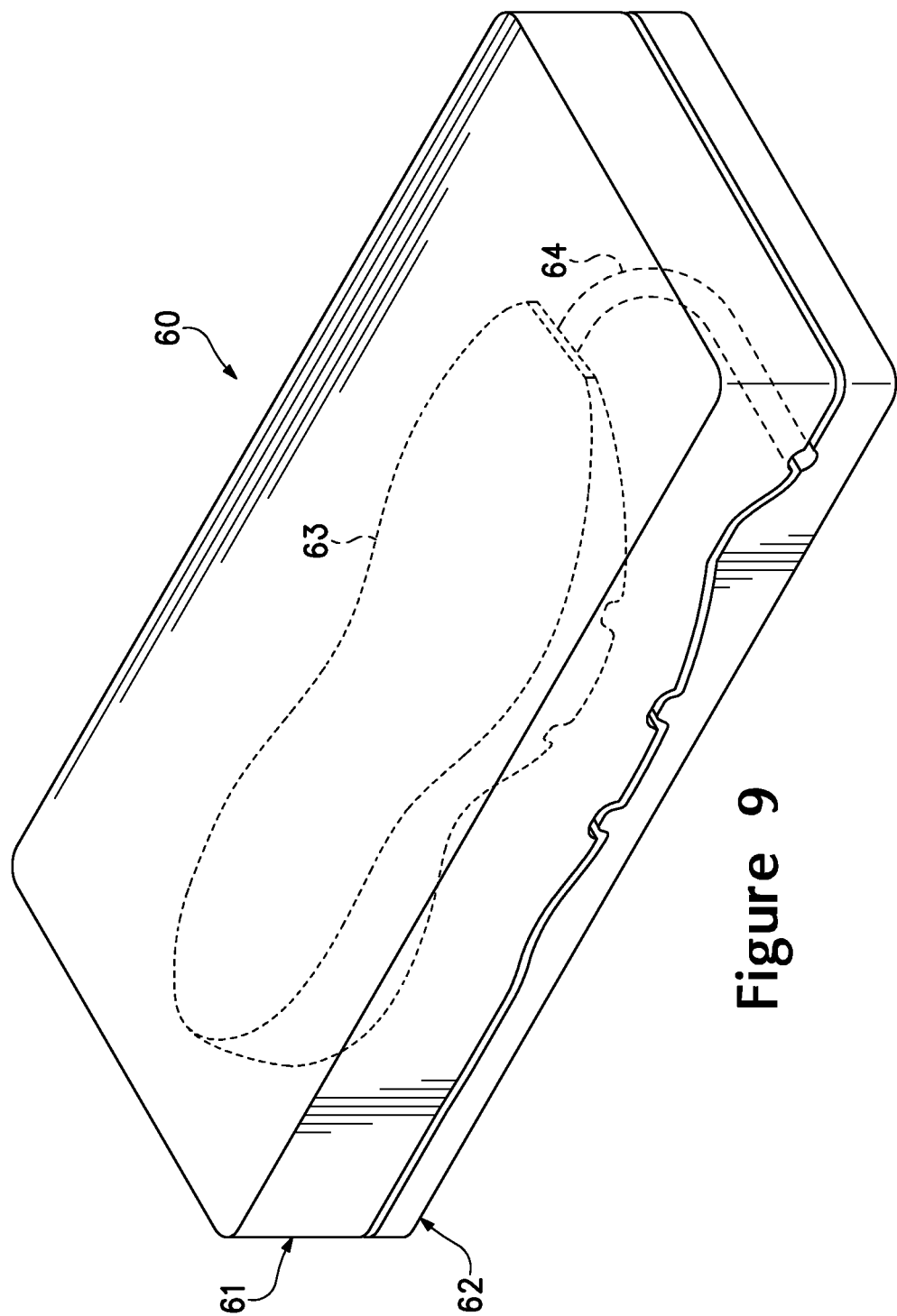
FIG. 9 is a perspective view of a mold for forming the chamber.

A mold 60 having an upper mold portion 61 and a lower mold portion 62 may be formed to have the configuration depicted in FIG. 9. Each of mold portions 61 and 62 cooperatively define an internal cavity 63 with the configuration of chamber 31. When mold portions 61 and 62 are joined together, therefore, cavity 63 has dimensions substantially equal to the exterior dimensions of chamber 31 in an unpressurized state. In other configurations, mold portions 61 and 62 may cooperatively define two internal cavities 63, one having the configuration of chamber 31, which is suitable for footwear 10 when configured for the right foot of the individual, and the other having the configuration of a mirror image of chamber 31, which is suitable for footwear 10 when configured for the left foot of the individual.

Figure 10A:
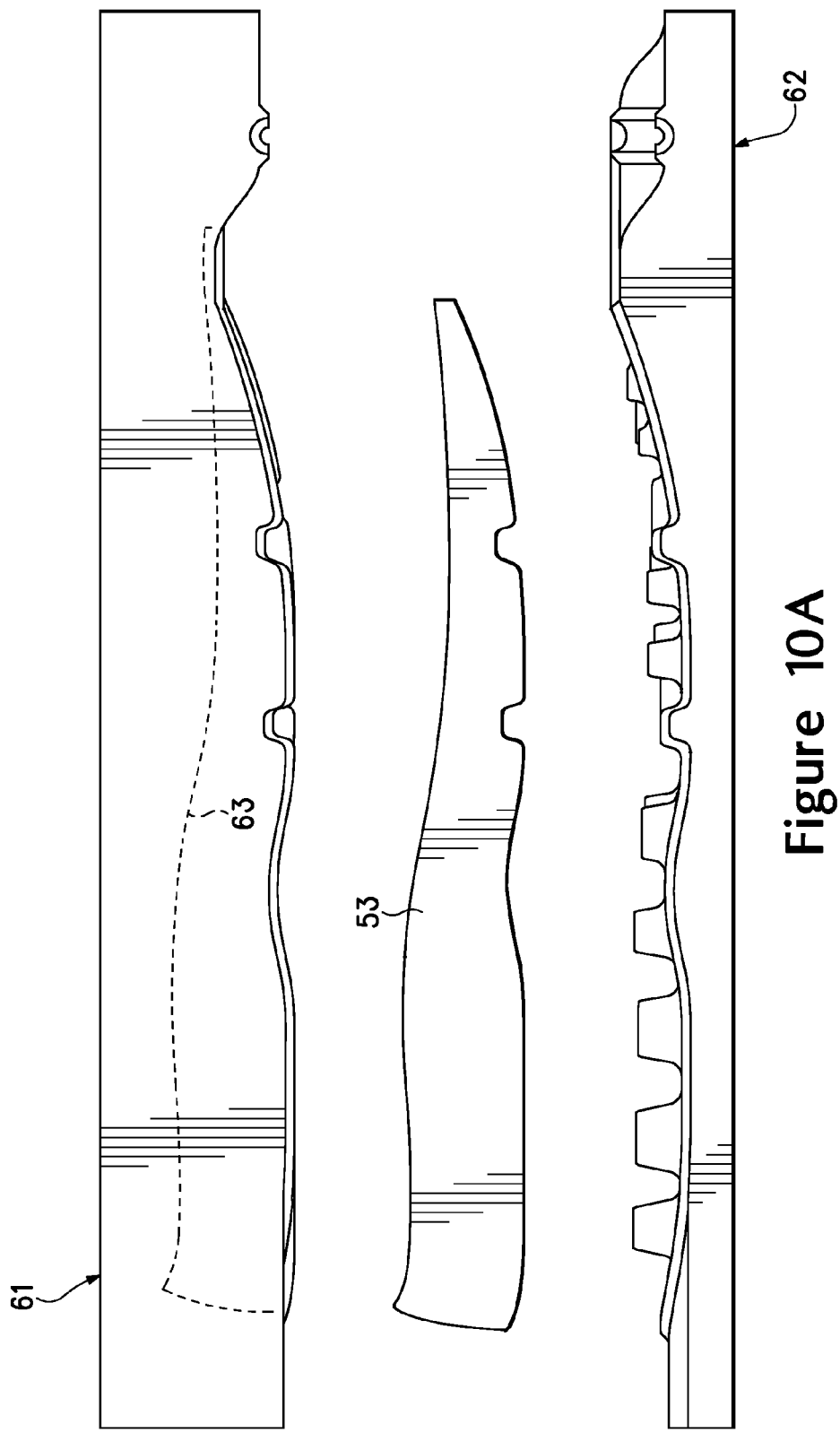
FIGS. 10A-10C are side elevational views of the mold depicting a method of manufacturing the chamber.
Figure 10B:
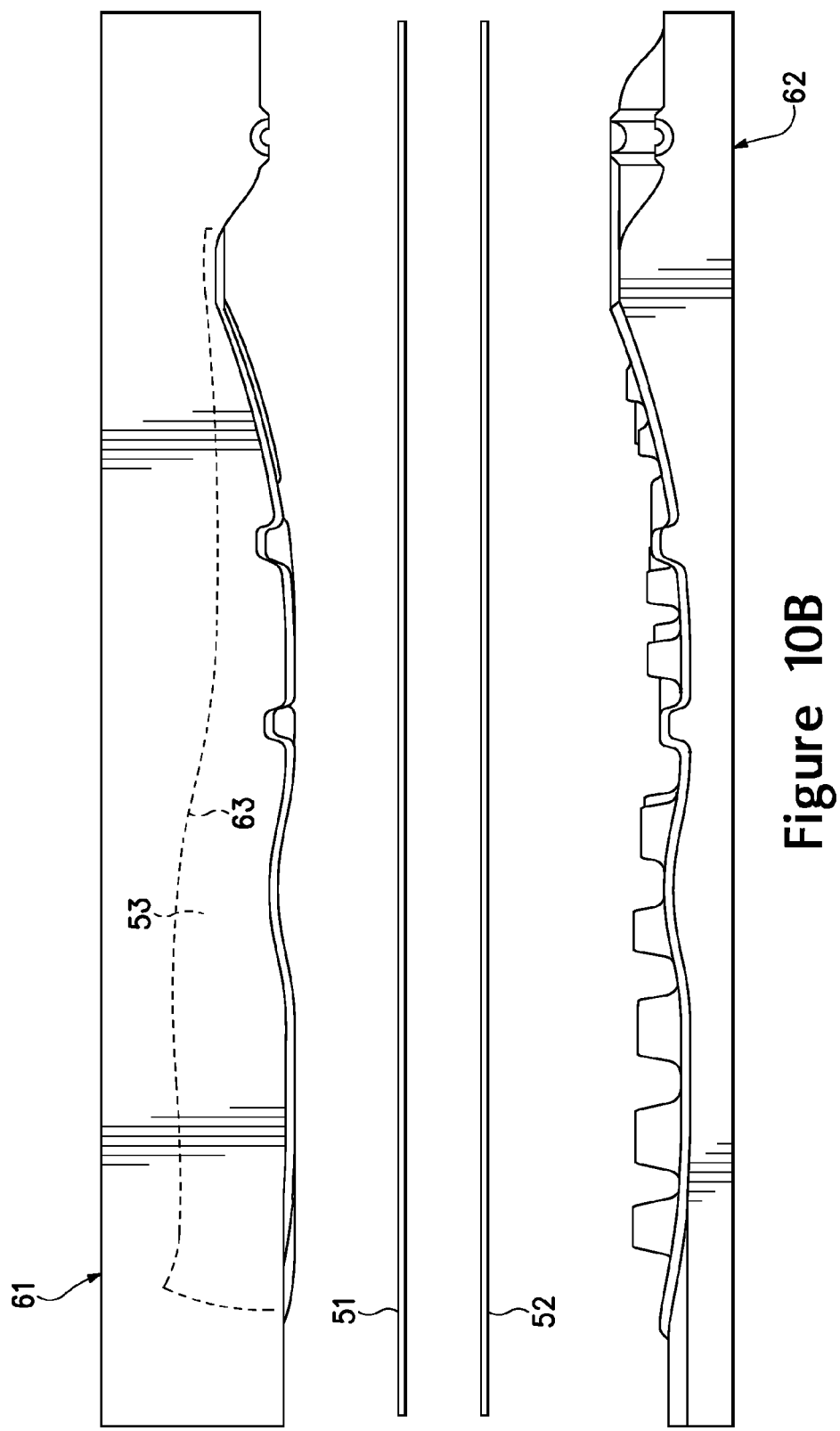

The manner in which mold 60 is utilized to form chamber 31 from sheets 51-53 will now be discussed in greater detail. Initially, sheet 53 is cut (e.g., with a die cutting or laser cutting operation) to have the general shape of sidewall surface 43. In addition, sheet 53 may also be heated and shaped to further impart the shape, contour, and overall configuration of sidewall surface 43 (e.g., with thermoforming or vacuumforming techniques). Once properly formed, sheet 53 is positioned between mold portions 61 and 62, as depicted in FIG. 10A. Sheet 53 may then be located within upper mold portion 61 and against a surface of cavity 63 that corresponds with sidewall surface 43 of chamber 31. Sheets 51 and 52 are then positioned between mold portions 61 and 62 as depicted in FIG. 10B. A plurality of conduits may extend through mold 60 in order to channel a heated liquid, such as water or oil, through mold 60, thereby raising the overall temperature of mold 60. When sheets 51-53 are positioned within mold 60, as described in greater detail below, heat may be transferred from mold 60 to sheets 51-53 in order to raise the temperature of sheets 51-53. At elevated temperatures that depend upon the specific polymer material utilized, sheets 51-53 soften or become more deformable, which facilitates shaping and bonding. In some manufacturing processes, various conductive or radiative heaters may be utilized to heat sheets 51-53 prior to placement within mold 60 in order to decrease manufacturing times. The temperature of mold 60 may vary depending upon the specific materials utilized for sheets 51-53.

Sheet 51 forms upper surface 41 and an interior portion of sidewall surface 43. Sheet 52 forms lower surface 42, and sheet 53 forms the exterior portion of sidewall surface 43. The thickness of sheets 51 and 52 prior to molding may be greater than the thickness of sheets 51 and 52 once incorporated into chamber 31. The rationale for the difference in thickness between sheets 51 and 52 is that sheets 51 and 52 may stretch during the thermoforming process. That is, the thickness differences compensate for thinning in sheets 51 and 52 that occurs when sheets 51 and 52 are stretched or otherwise deformed during the formation of surfaces 41-43. In addition to sheets 51 and 52, sheet 53 may also experience stretching and thinning during the thermoforming process. In general, however, the stretching and thinning of sheet 53 may be less than the stretching and thinning of sheets 51 and 52.

Figure 10C:
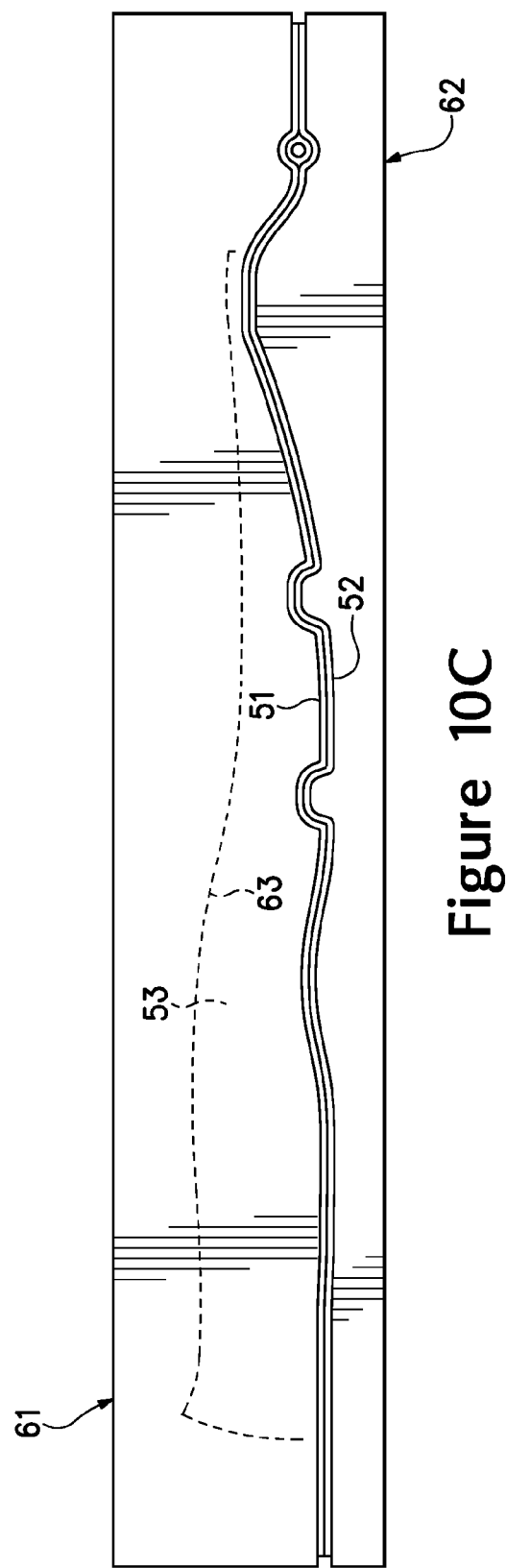

Once sheet 53 is located within upper mold portion 61 and sheets 51 and 52 are positioned between mold portions 61 and 62, mold 60 closes such that sheets 51 and 52 enter cavity 63 and are shaped and bonded, as depicted in FIG. 10C. That is, mold portions 61 and 62 translate toward each other and draw sheets 51 and 52 into cavity 63. As mold 60 contacts and compresses portions of sheets 51 and 52, air or another fluid having a positive pressure in comparison with ambient air may be injected between sheets 51 and 52 to induce sheets 51 and 52 to respectively contact and conform to the contours of mold portions 61 and 62. In addition, the positive pressure between sheets 51 and 52 also induces sheet 51 to contact and press sheet 53 against surfaces of cavity 63. Air may also be removed from the area between sheets 51-53 and mold portions 61 and 62 through various vents, thereby drawing sheets 51-53 onto the surfaces of cavity 63. That is, at least a partial vacuum may be formed between sheets 51-53 and the surfaces of mold portions 61 and 62. As the area between sheets 51 and 52 is pressurized and air is removed from the area between mold 60 and sheets 51-53, sheets 51-53 conform to the shape of mold 60. More specifically, sheets 51-53 stretch, bend, or otherwise conform to extend along the surfaces of cavities 63 within mold 60 and form the general shape of chamber 31. In addition to being shaped, sheets 51-53 are also bonded to each other in various locations. More particularly, (a) mold portions 61 and 62 compress sheets 51 and 52 together at a location corresponding with peripheral bond 44, which is at an interface between surfaces 42 and 43, (b) mold portions 61 and 62 compress sheets 51 and 52 together at a location corresponding with the various interior bonds 45, and (c) contact between sheets 51 and 53 bonds sheets 51 and 53 to each other in the area of sidewall surface 43.

Figure 11:
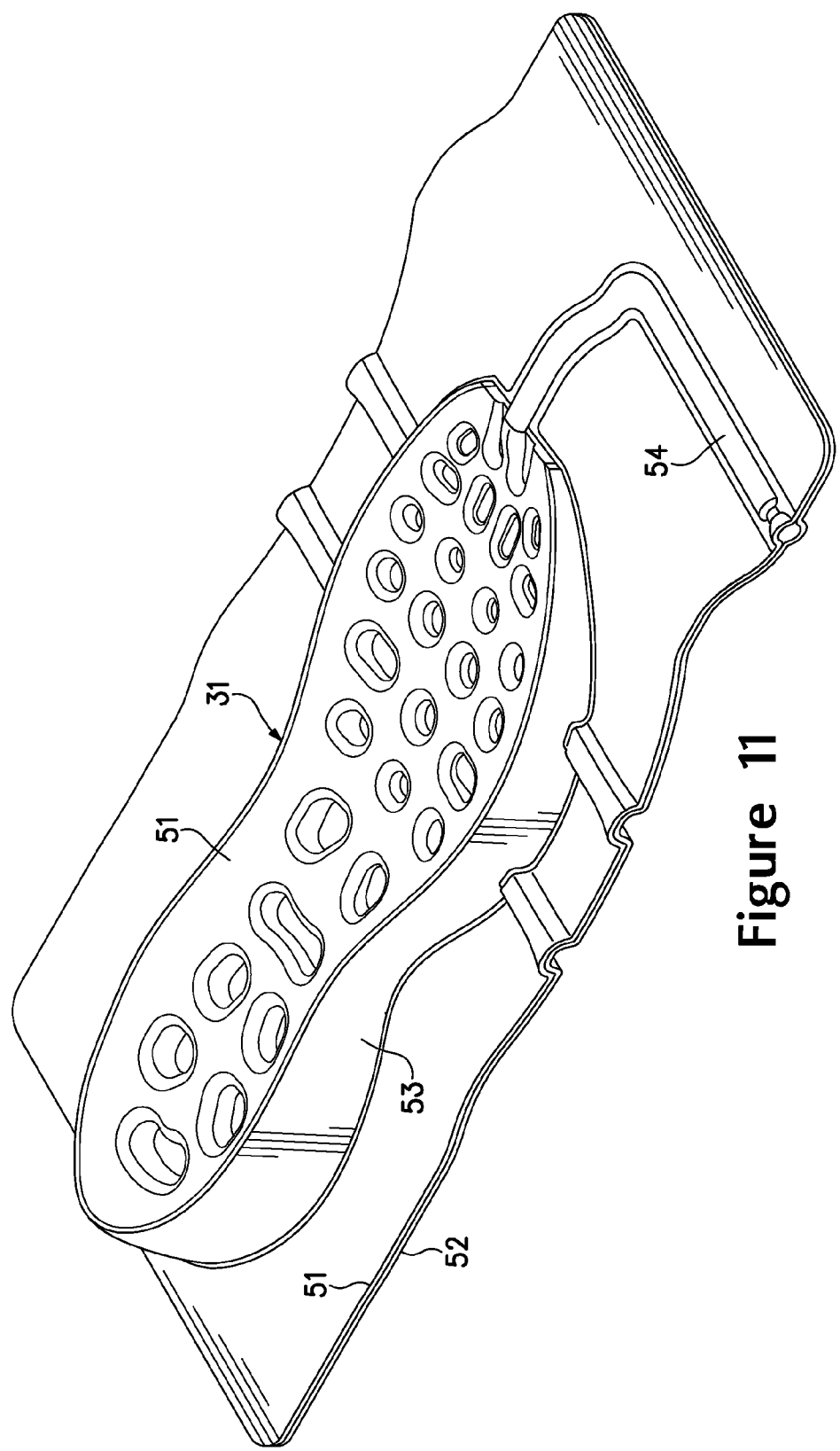
FIG. 11 is a perspective view of the chamber following removal from the mold.

Once chamber 31 is formed within mold 60, mold portions 61 and 62 separate such that chamber 31 and peripheral portions of polymer sheets 51 and 52 may be removed from mold 60, as depicted in FIG. 11. Chamber 31 is then permitted to cool, and a pressurized fluid may be injected in a conventional manner. Referring to FIG. 9, mold portions 61 and 62 are depicted as cooperatively forming a channel 64 extending from an exterior of mold 60 to cavity 63. During the thermoforming process discussed above, channel 64 forms a conduit 54 in sheets 51 and 52 that leads to chamber 31. Conduit 54 may be utilized to inject the pressurized fluid, and conduit 54 may then be sealed at a position that corresponds with peripheral bond 44 to seal chamber 31. In addition, excess portions of sheets 51 and 52 may be trimmed or otherwise removed from chamber 31. When formed from recyclable materials, the excess portions may then be recycled or reutilized to form additional sheets 51-53 for other chambers 31.

Although the thermoforming process discussed above is a suitable manner of forming chamber 31, a blowmolding process may also be utilized. In general, a suitable blowmolding process involves positioning a parison between a pair of mold portions, such as mold portions 61 and 62. The parison is a generally hollow and tubular structure of molten polymer material. In forming the parison, the molten polymer material is extruded from a die. The wall thickness of the parison may be substantially constant, or may vary around the perimeter of the parison. Accordingly, a cross-sectional view of the parison may exhibit areas of differing wall thickness. Suitable materials for the parison include many of the materials discussed above with respect to chamber 31. Following placement of sheet 53 within the mold and the parison between the mold portions, the mold portions close upon the parison and pressurized air within the parison induces the liquefied elastomeric material to contact sheet 53 and the surfaces of the mold. Air may also be evacuated from the area between the parison and the mold portions to further facilitate molding and bonding. Accordingly, chamber 31 may also be formed through a blowmolding process wherein sheet 53 is placed within the mold prior to forming the remainder of chamber 31. As further alternatives, sheet 53 may be bonded to sidewall surface 43 following formation of the remainder of chamber 31 or a rotational molding process may be utilized for form chamber 31.

Further Configurations

Chamber 31, as discussed above and in the figures, has a configuration that is suitable for a variety of footwear types and athletic activities. In further configurations, chamber 31 may exhibit greater thickness adjacent medial side 15 than lateral side 14 in order to limit pronation of the foot. The typical motion of the foot during running proceeds as follows: First, the heel strikes the ground, followed by the ball of the foot. As the heel leaves the ground, the foot rolls forward so that the toes make contact, and finally the entire foot leaves the ground to begin another cycle. During the time that the foot is in contact with the ground and rolling forward, it also rolls or pronates from the outside or lateral side to the inside or medial side. By providing greater thickness to medial side 15 than lateral side 14, the rolling motion of the foot may be limited to control pronation.

Figure 12A:
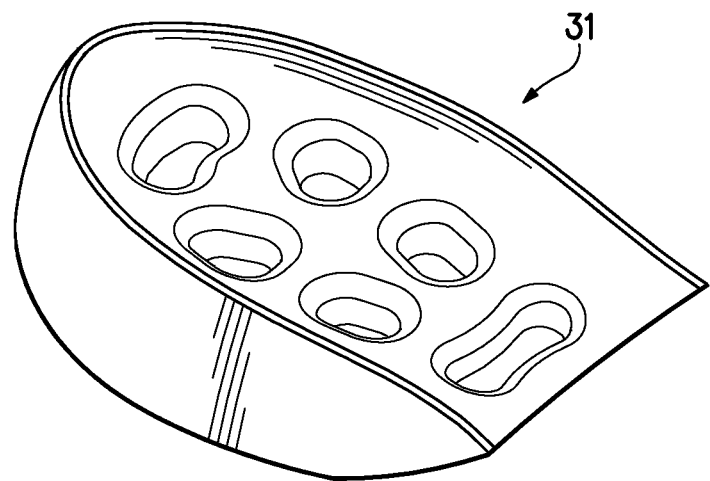
FIGS. 12A-12G are perspective views depicting additional configurations of the chamber.
Figure 12B:
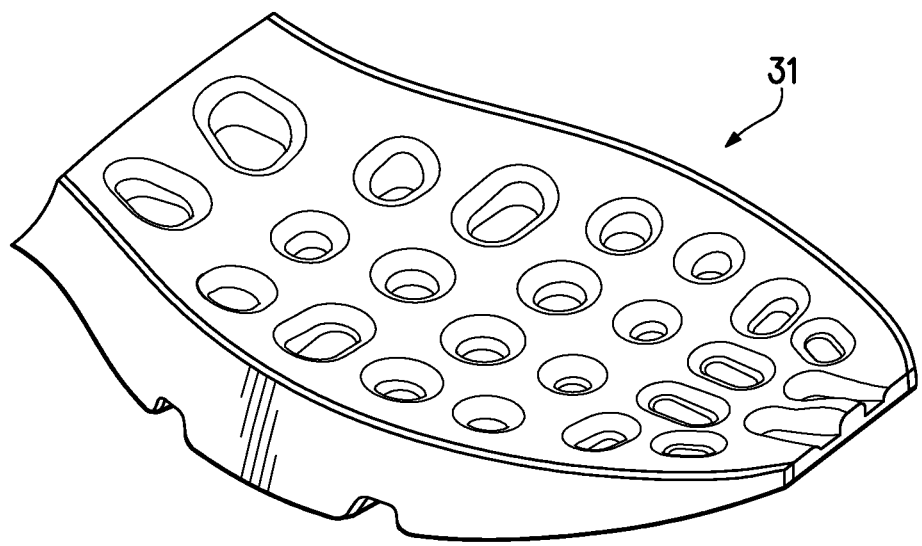

When incorporated into footwear 10, chamber 31 has a shape that fits within a perimeter of midsole 31 and extends from forefoot region 11 to heel region 13 and also from lateral side 14 to medial side 15, thereby corresponding with a general outline of the foot. Although this configuration of chamber 31 is suitable for many footwear types, chamber 31 may have a configuration that only extends under portions of the foot. With reference to FIG. 12A, a version of chamber 31 that is intended to be located primarily in heel region 13 is depicted. Similarly, a version of chamber 31 that is intended to be located primarily in forefoot region 11 is depicted in FIG. 12B. In other configurations, chamber 31 may be limited to one of sides 14 and 15, or chamber 31 may be limited to midfoot region 12, for example.

Figure 12C:
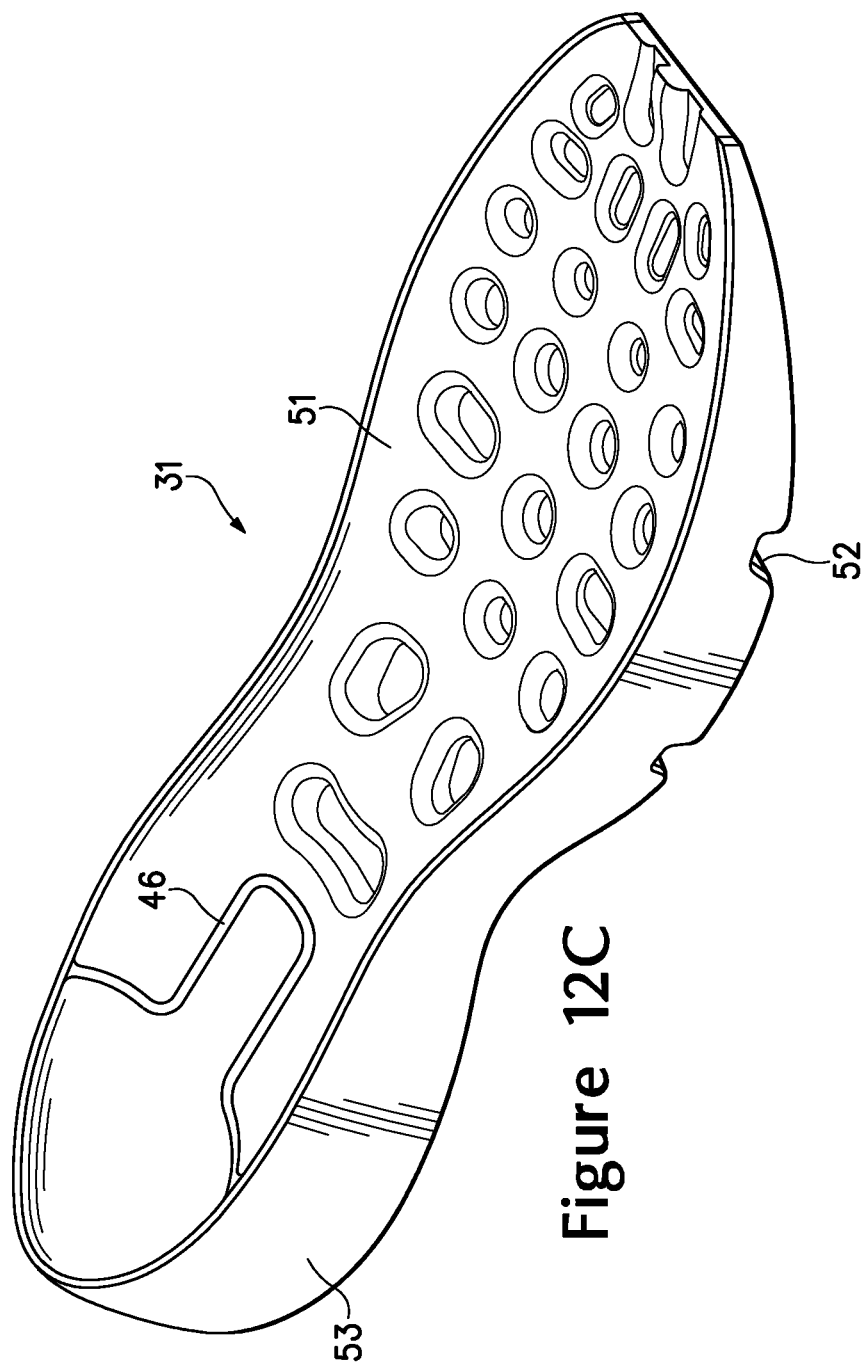

Chamber 31 has a configuration wherein the fluid is free to flow between regions 11-13 and is at one pressure. That is, chamber 31 forms a single interior volume for enclosing the fluid. In another configuration, as depicted in FIG. 12C, a bond 46 extends across chamber 31 and between sides 14 and 15. Bond 46 joins sheets 51 and 52 to effectively segregate chamber 31 into two subchambers that may each enclose a fluid with different pressures. More particularly, bond 46 extends across heel region 13 to provide a different fluid pressure in heel region 13 than in forefoot region 11 and midfoot region 12. In some configurations, a bond similar to bond 53 may extend from forefoot region 11 to heel region 13, for example, in order to provide different fluid pressures in areas of chamber 31 corresponding with sides 14 and 15.

Figure 12D:
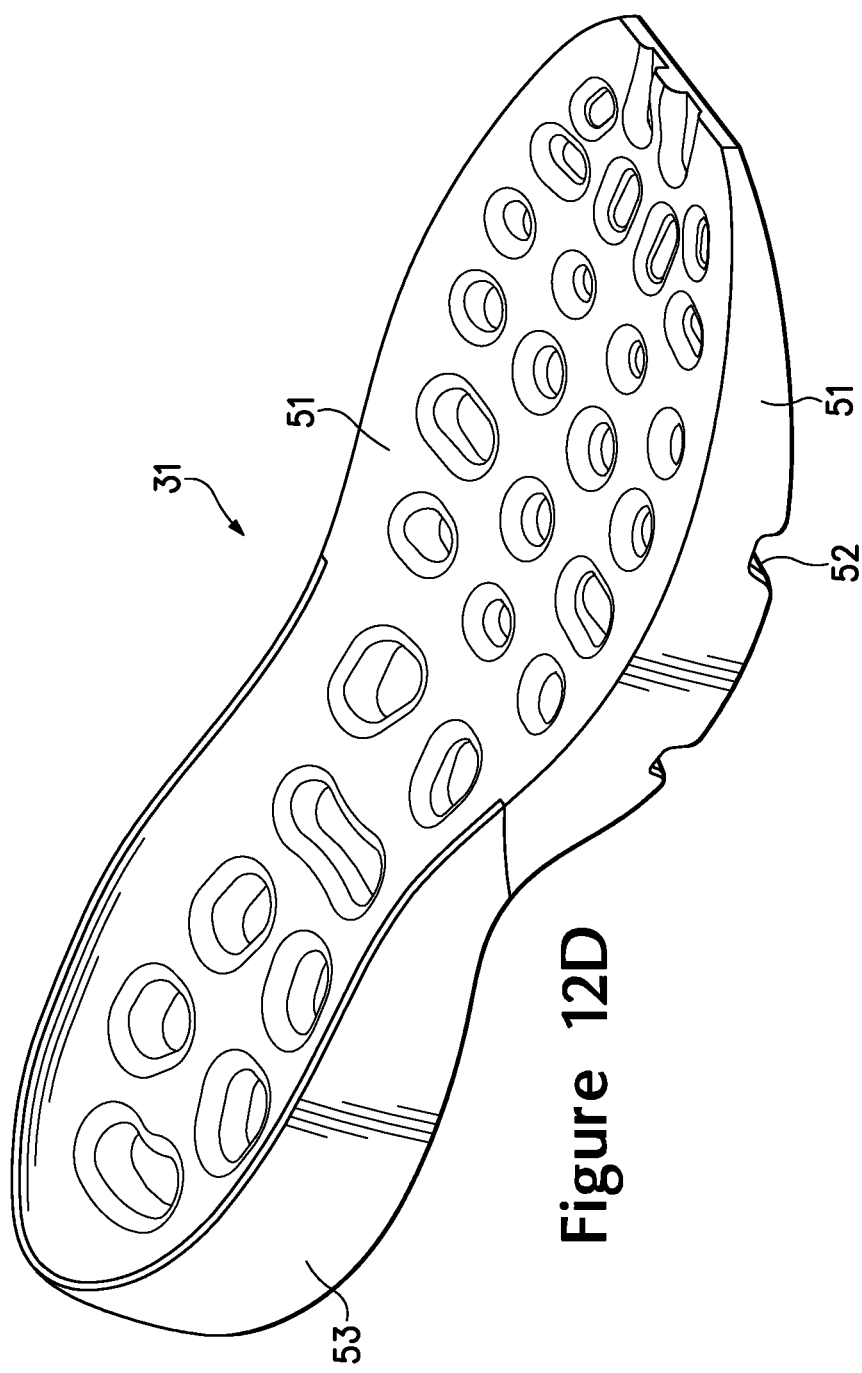
Figure 12E:
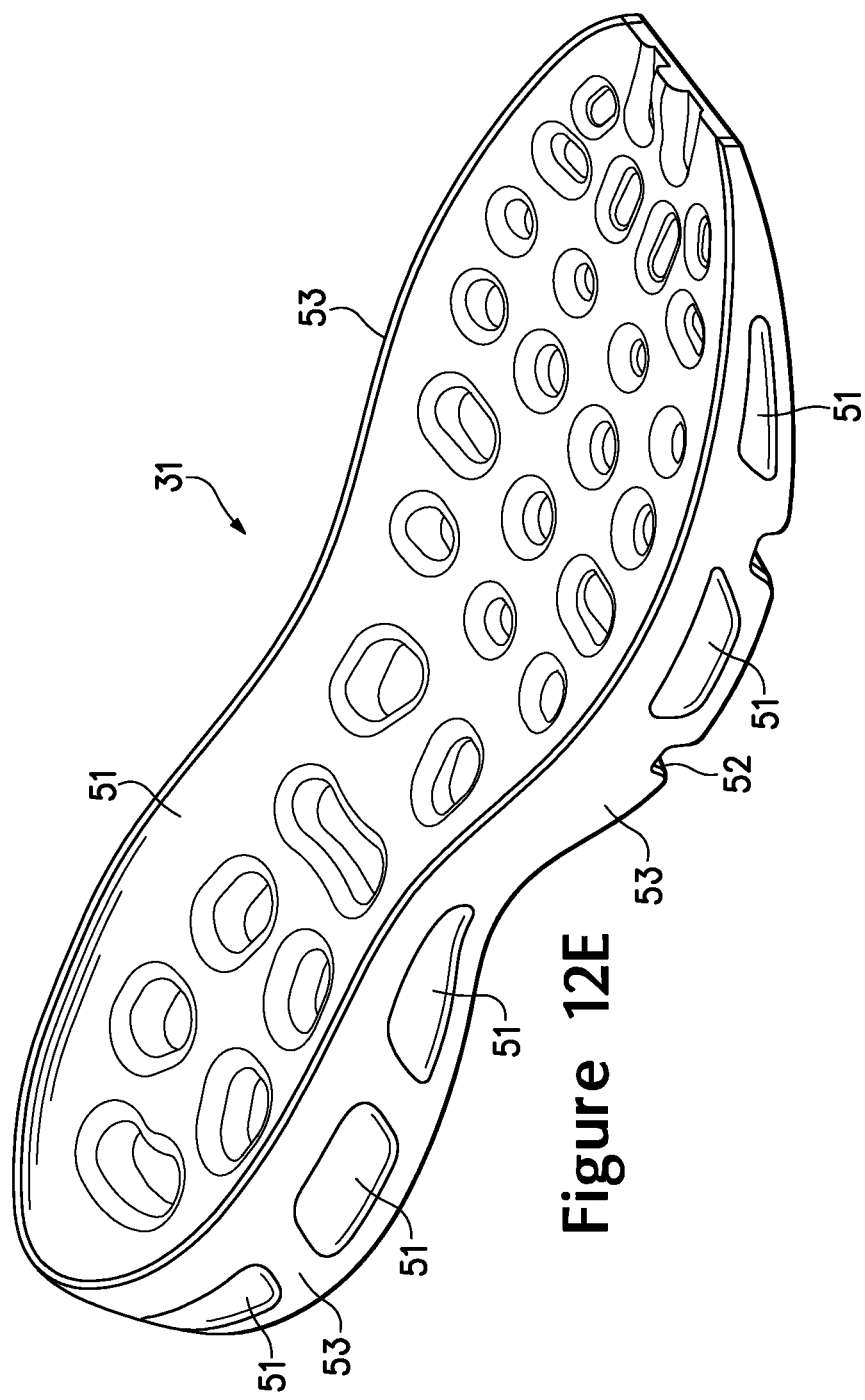

Although sheet 53 is depicted as forming the exterior of substantially all of side surface 43, portions of the exterior of side surface 53 may also be formed by sheet 51 in some configurations of chamber 31. As an example, sheet 53 is depicted as being limited to heel region 13 and a portion of midfoot region 12 in FIG. 12D. That is, sheet 53 is primarily located in the area where sidewall surface 43 has the greatest height because this is the area that is most likely to expand or otherwise distend outward from the pressurized fluid. As another example, sheet 53 is depicted as defining various apertures that expose portions of sheet 51 in FIG. 12E. When formed to have apertures, sheet 51 may protrude into the apertures such that sheets 51 and 53 form a smooth interface on the exterior of sidewall surface 43.

In the configurations depicted in FIGS. 3-8, substantially all of surfaces 41 and 42 are formed from one sheet and substantially all of sidewall surface 43 is formed from two sheets. In the configurations depicted in FIGS. 12D and 12E, at least half of surfaces 41 and 42 are formed from one sheet and at least half of sidewall surface 43 is formed from two sheets. In each of the configurations disclosed herein, therefore, a majority or at least half of surfaces 41 and 42 are formed from one sheet and a majority or at least half of sidewall surface 43 is formed from two sheets. In some configurations, however, less than half of surfaces 41 and 42 may be formed from one sheet and less than half of sidewall surface 43 may be formed from two sheets.

Figure 12F:
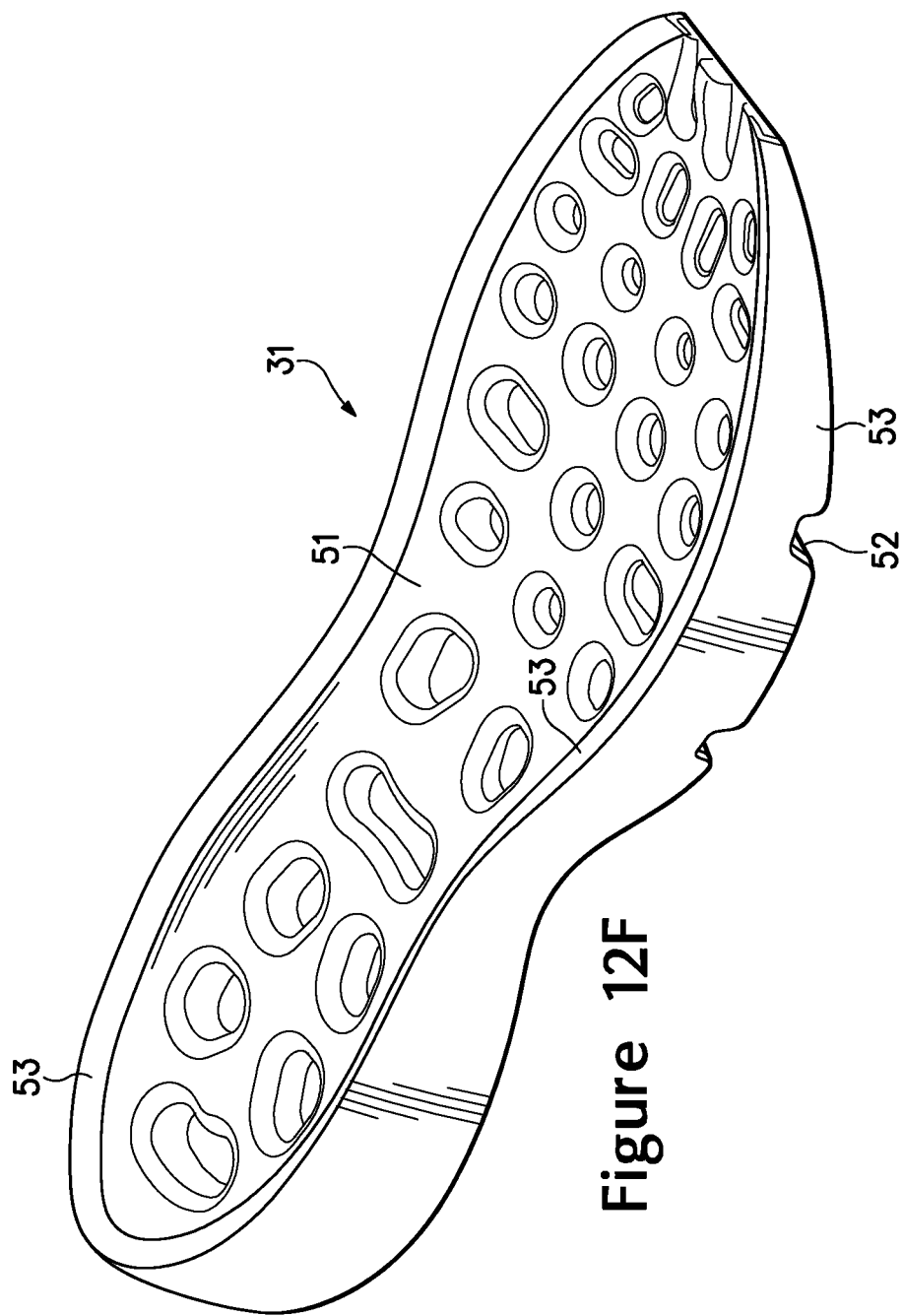

In each of the configurations discussed above, sheet 53 is limited to sidewall surface 43. In other configurations, sheet 53 may extend onto either of surfaces 41 and 42. Referring to FIG. 12F, sheet 53 extends upward from sidewall surface 43 and wraps onto upper surface 41, thereby forming a peripheral portion of the exterior of upper surface 43. An advantage to this configuration is that an upper edge of sheet 53 may be located within footwear 10 and hidden from the individual wearing footwear 10. Furthermore, this configuration may enhance the stability of chamber 31 when compressed. Prior to inserting this configuration of sheet 53 into mod 60, various thermoforming or vacuum forming techniques may be utilized to form sheet 53 to have an angled configuration that wraps onto upper surface 41.

Figure 12G:
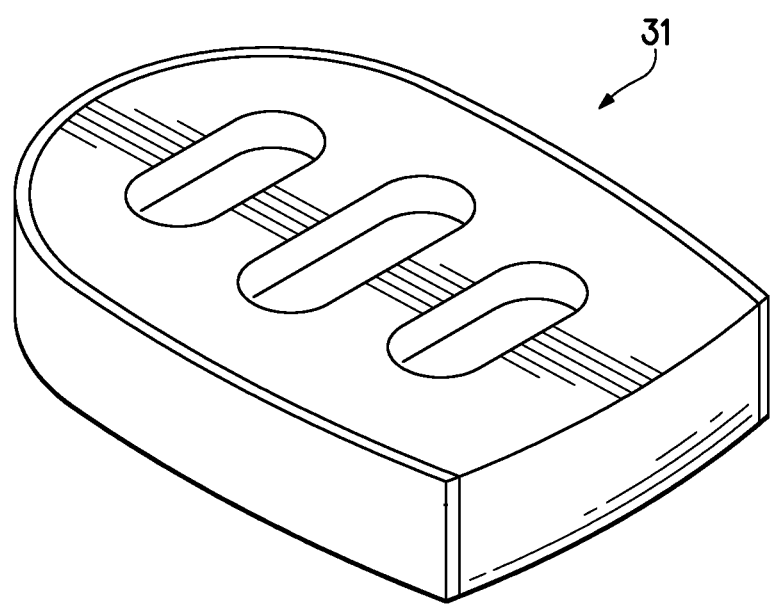

Another configuration of chamber 31 is depicted in FIG. 12G. When incorporated into footwear 10, this configuration of chamber 31 may be encapsulated within a polymer foam material, such as polyurethane or ethylvinylacetate. Portions of chamber 31 may be exposed through apertures in the foam material so as to be visible from an exterior of footwear 10, or chamber 31 may be entirely encapsulated by the foam material.

Chamber 31 may also exhibit a variety of other configurations. Whereas sheets 51 and 53 form sidewall surface 43 in the configurations discussed above, sheets 52 and 53 may also be utilized to form sidewall surface 43. Although sheets 51-53 may be formed from the same polymer materials, each of sheets 51-53 may also be formed from different polymer materials. In some configurations, sidewall surface 43 may also have the thickness of three or more sheets to impart additional thickness. Although sheets 51-53 may be clear to permit the interior of chamber 31 to be viewed from an exterior of footwear 10, sheets 51-53 may also be opaque and may be tinted with a variety of colors. Whereas sheet 53 is depicted as extending along both of sides 14 and 15 and around heel region 13, sheet 53 may also be limited to a smaller area of sidewall surface 53.

Figure 13:
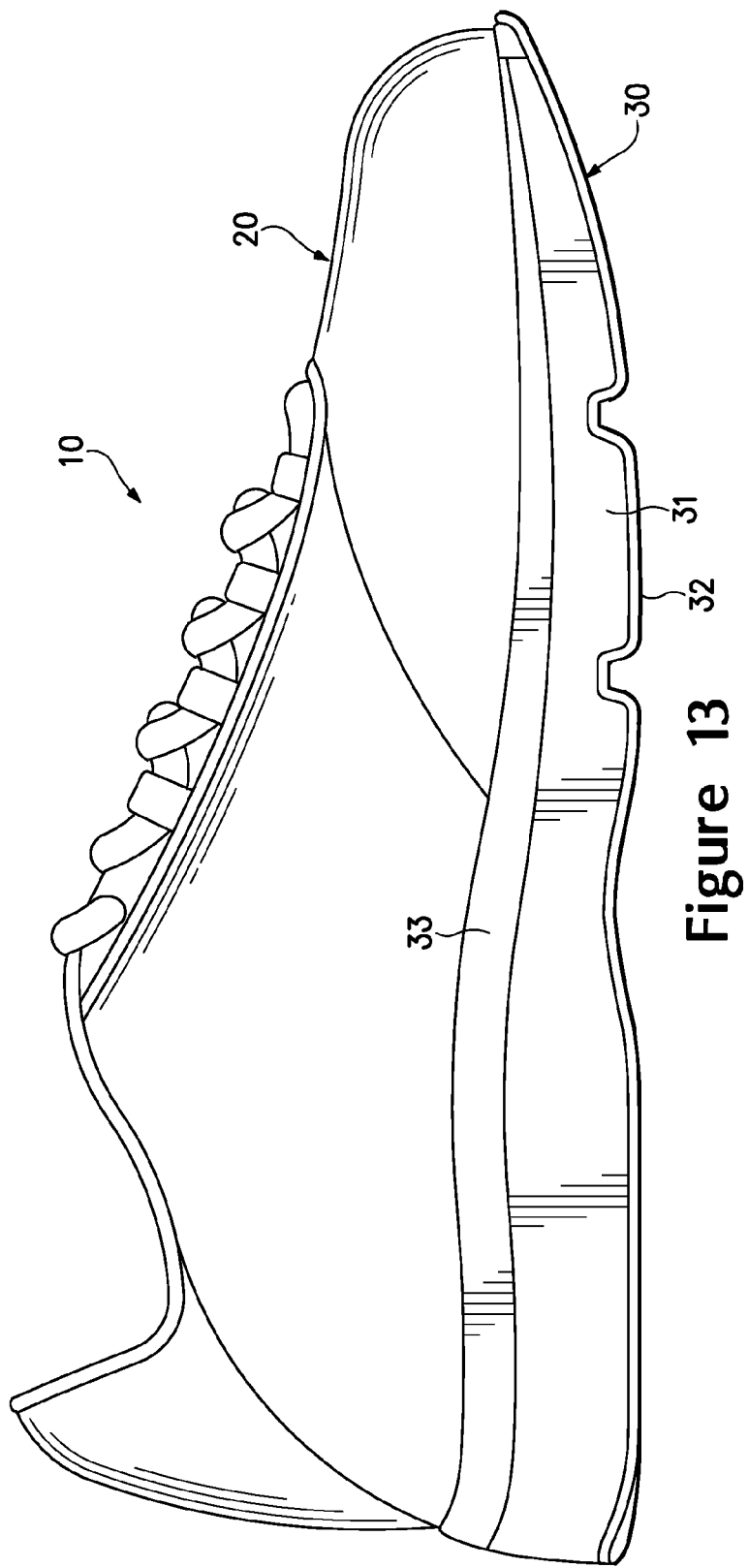
FIG. 13 is a side elevational view depicting an additional configuration of the article of footwear.

Footwear 10 is discussed above as having a configuration wherein chamber 31 is secured to upper 20. Referring to FIG. 13, a foam layer 33 is depicted as extending between chamber 31 and upper 20. In further configurations of footwear 10, other elements may extend between chamber 31 and upper 20, including plates, support members, moderators, or reinforcing structures, for example. Accordingly, sole structure 30 may include a variety of elements in addition to chamber 31 and outsole 32.

The invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

What is claimed is:

1. A method of manufacturing a fluid-filled chamber for an article of footwear, the method comprising:
    locating a first sheet, a second sheet, and a third sheet of a polymer material within a mold, the polymer material including a plurality of layers selected from the group consisting of (a) layers of thermoplastic polyurethane and ethylene-vinyl alcohol copolymer, (b) layers of ethylene-vinyl alcohol copolymer, thermoplastic polyurethane, and a regrind material of thermoplastic polyurethane and ethylene-vinyl alcohol copolymer, and (c) layers of a gas barrier material and an elastomeric material, and each of the first sheet, the second sheet, and the third sheet of the polymer material including multiple layers of different polymer materials;
    shaping the first sheet to define at least a first surface and an interior layer of a sidewall portion of the chamber;
    shaping the second sheet to define a second surface of the chamber; and
    bonding the third sheet to the interior layer of the sidewall portion to form an exterior layer of the sidewall portion.

2. The method recited in claim 1, further including a step of bonding the second sheet to the interior layer of the sidewall portion.

3. The method recited in claim 1, further including a step of pressurizing and sealing the chamber.

4. The method recited in claim 1, further including a step of bonding the first sheet to the second sheet to define a plurality of interior bonds that are spaced inward from the sidewall portion of the chamber.

5. The method recited in claim 1, further including a step of heating and shaping the third sheet prior to locating the first sheet, the second sheet, and the third sheet within the mold.

6. A method of manufacturing a fluid-filled chamber for an article of footwear, the method comprising:
    placing three separate sheets of a polymer material within a mold, the polymer material including a plurality of layers selected from the group consisting of (a) layers of thermoplastic polyurethane and ethylene-vinyl alcohol copolymer, (b) layers of ethylene-vinyl alcohol copolymer, thermoplastic polyurethane, and a regrind material of thermoplastic polyurethane and ethylene-vinyl alcohol copolymer, and (c) layers of a gas barrier material and an elastomeric material, and each of the three separate sheets including multiple layers of different polymer materials;
    shaping at least two of the sheets to form a first surface and an opposite second surface of the chamber; and
    bonding at least two of the sheets together in an overlapping configuration to form a third surface of the chamber, the third surface being located to extend between the first surface and the second surface.

7. The method recited in claim 6, further including a step of bonding the first surface to the second surface through an interior of the chamber.

8. The method recited in claim 6, further including a step of bonding the first sheet to the second sheet to define a plurality of interior bonds that are spaced inward from the sidewall portion of the chamber.

9. The method recited in claim 6, further including a step of pressurizing and sealing the chamber.

10. The method recited in claim 6, further including a step of heating and shaping at least one of the sheets prior to placing the three separate sheets within the mold.

11. The method recited in claim 6, further including a step of incorporating the chamber into a sole structure of the article of footwear.

12. A method of manufacturing a fluid-filled chamber for an article of footwear, the method comprising:
    placing a first sheet, a second sheet, and a third sheet of a polymer material within a mold, the polymer material including a plurality of layers selected from the group consisting of (a) layers of thermoplastic polyurethane and ethylene-vinyl alcohol copolymer, (b) layers of ethylene-vinyl alcohol copolymer, thermoplastic polyurethane, and a regrind material of thermoplastic polyurethane and ethylene-vinyl alcohol copolymer, and (c) layers of a gas barrier material and an elastomeric material, and each of the three sheets including multiple layers of different polymer materials;

shaping the first sheet and the second sheet to form a first portion of the chamber and an opposite second portion of the chamber; and bonding the first sheet and the third sheet together in an overlapping configuration to form a third portion of the chamber extending between the first portion and the second portion.

13. The method recited in claim 12, further including a step of pressurizing and sealing the chamber.

14. The method recited in claim 12, further including a step of heating and shaping the third sheet prior to placing the first sheet, the second sheet, and the third sheet within the mold.

15. The method recited in claim 12, further including a step of bonding the first sheet to the second sheet to define a plurality of interior bonds that are spaced inward from the third portion of the chamber.

\* \* \* \* \*